US010321699B2

(12) United States Patent
Gates et al.

(10) Patent No.: US 10,321,699 B2
(45) Date of Patent: Jun. 18, 2019

(54) FROZEN BEVERAGE DISPENSER

(71) Applicant: FBD Partnership, LP, San Antonio, TX (US)

(72) Inventors: Matthew Gates, Schertz, TX (US); Adam Raybin, Burnsville, MN (US); Gilbert Salazar, Universal City, TX (US)

(73) Assignee: FBD Partnership, LP, San Antonio, TX (US)

( * ) Notice: Subject to any disclaimer, the term of this patent is extended or adjusted under 35 U.S.C. 154(b) by 0 days.

(21) Appl. No.: 15/220,867

(22) Filed: Jul. 27, 2016

(65) Prior Publication Data

US 2017/0027186 A1    Feb. 2, 2017

Related U.S. Application Data

(60) Provisional application No. 62/199,423, filed on Jul. 31, 2015.

(51) Int. Cl.
| | |
|---|---|
| *A23G 9/04* | (2006.01) |
| *A23G 9/22* | (2006.01) |
| *A23G 9/28* | (2006.01) |
| *F16J 15/3236* | (2016.01) |
| *F25D 11/02* | (2006.01) |
| *F25D 29/00* | (2006.01) |
| *F25D 31/00* | (2006.01) |
| *F16J 15/06* | (2006.01) |
| *F16J 15/3268* | (2016.01) |

(52) U.S. Cl.
CPC .............. *A23G 9/045* (2013.01); *A23G 9/222* (2013.01); *A23G 9/224* (2013.01); *A23G 9/281* (2013.01); *F16J 15/061* (2013.01); *F16J 15/064* (2013.01); *F16J 15/3236* (2013.01); *F16J 15/3268* (2013.01); *F25D 11/022* (2013.01); *F25D 29/003* (2013.01); *F25D 31/002* (2013.01); *F25D 2600/02* (2013.01); *F25D 2600/04* (2013.01)

(58) Field of Classification Search
CPC ........ A23G 9/045; A23G 9/222; A23G 9/281; A23G 9/224; F16J 15/3268; F16J 15/064; F16J 15/061; F16J 15/3236; F25D 31/002; F25D 29/003; F25D 11/022; F25D 2600/02; F25D 2600/04
See application file for complete search history.

(56) References Cited

U.S. PATENT DOCUMENTS

| | | | | |
|---|---|---|---|---|
| 3,229,476 A | * | 1/1966 | Fraser | A23G 9/281 |
| | | | | 222/226 |
| 3,517,524 A | * | 6/1970 | Fiedler | A23G 9/045 |
| | | | | 222/129.1 |
| 3,661,303 A | * | 5/1972 | Prosenbauer | A23G 9/281 |
| | | | | 222/309 |
| 3,823,571 A | | 7/1974 | Smith et al. | |
| 5,388,925 A | * | 2/1995 | Wilcox | B43K 8/00 |
| | | | | 222/420 |
| 5,706,661 A | | 1/1998 | Frank | |
| 5,743,097 A | | 4/1998 | Frank | |

(Continued)

*Primary Examiner* — Donnell A Long
(74) *Attorney, Agent, or Firm* — McAughan Deaver PLLC

(57) ABSTRACT

An improved frozen product dispenser wherein a product is placed into a cooled hopper and the product is then fed from the hopper into a freezing and dispensing chamber where it is frozen and dispensed.

20 Claims, 21 Drawing Sheets

(56) References Cited

U.S. PATENT DOCUMENTS

| | | |
|---|---|---|
| 5,799,726 A | 9/1998 | Frank |
| 5,806,550 A | 9/1998 | Frank |
| 6,513,578 B2 | 2/2003 | Frank |
| 6,536,224 B2 | 3/2003 | Frank et al. |
| 6,625,993 B2 | 9/2003 | Frank et al. |
| 6,679,314 B2 | 1/2004 | Frank |
| 8,528,786 B2 | 9/2013 | Gates |
| 8,701,435 B2 | 4/2014 | Gist et al. |
| 8,701,939 B2 | 4/2014 | Frank et al. |
| 8,875,732 B2 | 11/2014 | Cloud |
| 9,388,033 B2 | 7/2016 | Gates |
| 2001/0035016 A1 | 11/2001 | Weber et al. |
| 2002/0108964 A1 | 8/2002 | Staten |
| 2003/0150227 A1 | 8/2003 | Ross |
| 2006/0054614 A1 | 3/2006 | Baxter |
| 2007/0251260 A1 | 11/2007 | Baxter |
| 2008/0202130 A1 | 8/2008 | Kadyk |
| 2010/0293965 A1 | 11/2010 | Frank et al. |
| 2011/0298184 A1 | 12/2011 | Aurelius |
| 2012/0261442 A1* | 10/2012 | Doelman ............ B67D 1/0082 222/547 |
| 2016/0089702 A1 | 3/2016 | Gates et al. |

\* cited by examiner

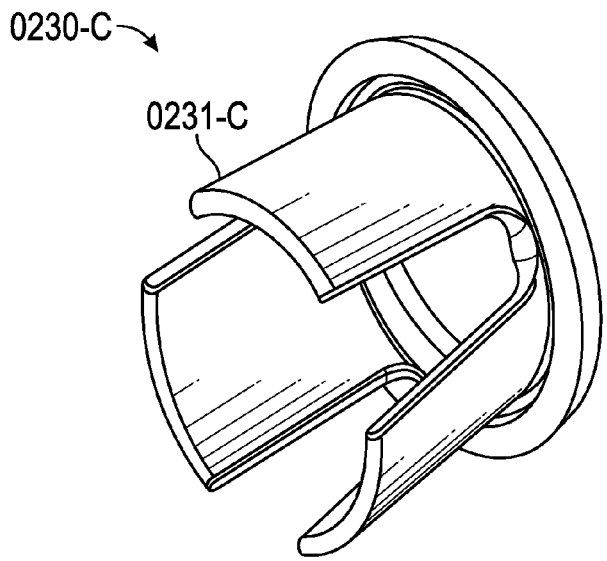
FIG. 10A
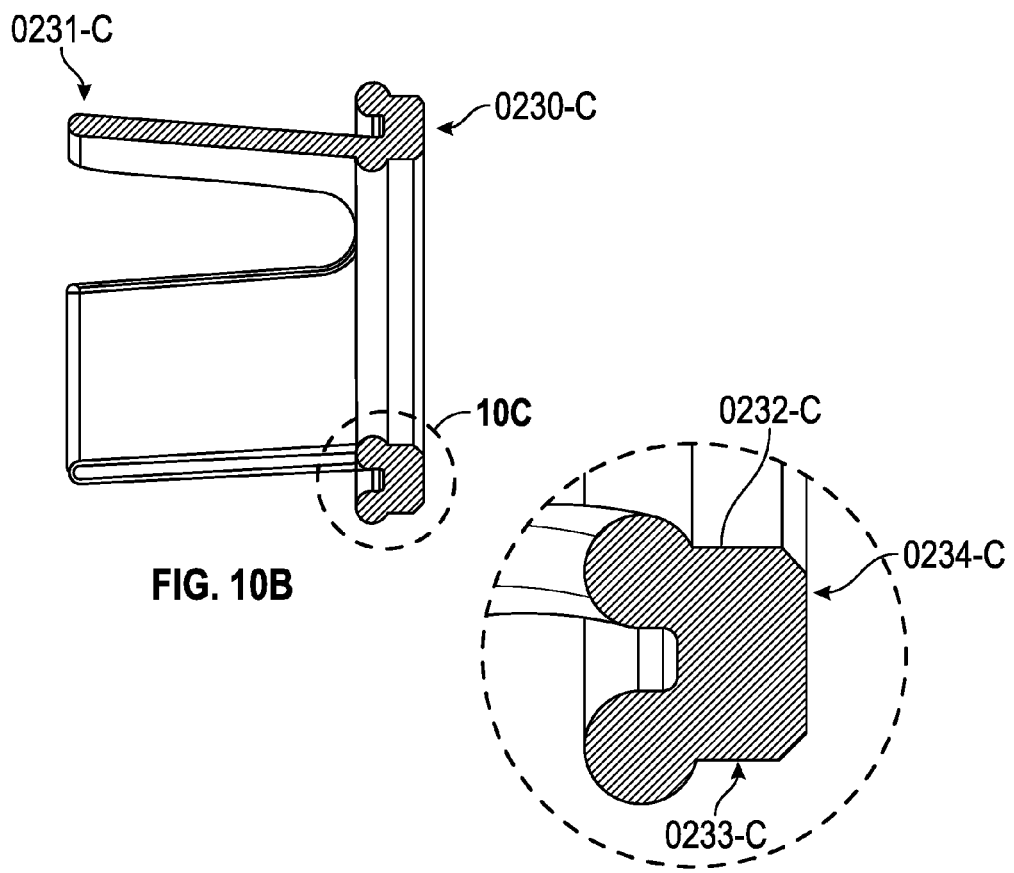
FIG. 10B
FIG. 10C

Step 1: Remove Auger & Bushing

Step 2: Remove Seal

Step 3: Remove Cap

Step 3: Remove Upper Stem

Step 3: Remove Lower Stem

FROZEN BEVERAGE DISPENSER

CROSS REFERENCE TO RELATED APPLICATIONS

The present application claims the benefit of and priority to U.S. Provisional Patent Application Ser. No. 62/199,423, filed Jul. 31, 2015, and the contents of which are hereby incorporated by reference in its entirety.

STATEMENT REGARDING FEDERALLY SPONSORED RESEARCH/DEVELOPMENT

Not applicable.

REFERENCE TO APPENDIX

Not applicable.

BACKGROUND OF THE INVENTION

The subject matter of this disclosure relates to an improved frozen product dispenser wherein a product is placed into a cooled hopper and the product is then fed from the hopper into a freezing and dispensing chamber where it is frozen and dispensed.

Frozen product dispensers, generally, have been known in the art and have been used to freeze and dispense a variety of products including, but not limited to food products such as beverages, ice cream, yogurt, and other food items. Such prior art dispensers have suffered from various shortcomings and/or limitations.

One of several objects of the teachings of this disclosure is to resolve or reduce the identified—and other—shortcomings and/or limitations in prior art frozen product dispensers.

BRIEF SUMMARY OF SELECT ASPECTS OF THE INVENTION

None of these brief summaries of the aspects invention is intended to limit or otherwise affect the scope of the appended claims, and nothing stated in this Brief Summary of the Invention is intended as a definition of a claim term or phrase or as a disavowal or disclaimer of claim scope.

The following examples are included to demonstrate preferred embodiments of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

As one of many possible brief summaries of the nature and substance of the inventions claimed herein, the disclosure provides an assembly for the dispensing of a beverage comprising a face plate and a first auger element. The face plate defines an interior space and a bearing surface located within the interior space. The first auger element may be positioned relative to the face plate such that the bearing surface is received within first auger element and at least a first portion of the first auger element is received within the internal space of the face plate.

As another of the many possible brief summaries of the nature and substance of the inventions claimed herein, the disclosure provides a dispensing mechanism for a beverage dispensing apparatus comprising (i) a barrel for storage of the beverage to be dispensed; (ii) a face plate, coupled to the barrel, the face plate having an internal surface defining a recessed space; (iii) a first auger element at least partially positioned within the recessed space of the face plate; and (iv) a drive shaft for causing rotation of the first auger element, wherein first auger element cooperates with the recessed space defined by the face plate to create a region of positive pressure to cause dispensing of the beverage and wherein the region of positive pressure at the point of product dispensing is not bounded by any portion of the barrel.

As another of the many possible brief summaries of the nature and substance of the inventions claimed herein, the disclosure provides an apparatus for use in a frozen food item dispensing machine comprising (i) a barrel for freezing the food item; (ii) a first auger positioned within the barrel, the first auger being mechanically coupled to a motor capable of rotating the first auger; (iii) a second auger element removably coupled to the first auger element such that rotation of the first auger element will normally cause rotation of the second auger element; and (iv) a face plate defining an interior cavity and an opening at least a portion of the second auger element positioned within the face plate interior cavity; and (v) a valve coupled to the face plate opening; wherein the second auger element cooperates with the interior space of the face plate such that opening of the valve and dispensing of the beverage will result in beverage flow through a region within the interior space and bounded on at least three sides by the face plate and the second auger.

As another of the many possible brief summaries of the nature and substance of the inventions claimed herein, the disclosure provides a product dispensing system comprising a faceplate, the faceplate defining a tubular channel extending substantially vertically on a front face of the faceplate, a rectangular channel extending substantially horizontally on a top portion of the faceplate; an upper valve member, the upper valve member positioned relative to the faceplate such that the upper valve member is received within the rectangular channel; and a lower valve member, the lower valve member positioned relative to the faceplate such that the lower valve member is received within the tubular channel, wherein the upper valve member and the lower valve member are matingly coupled.

As another of the many possible brief summaries of the nature and substance of the inventions claimed herein, the disclosure provides a dispensing mechanism for a beverage dispensing apparatus comprising a faceplate, the faceplate defining a hollow canal extending substantially vertically on a forward-facing section of the faceplate, a four-sided canal extending substantially horizontally on a upper section of the faceplate; and a valve stem, the stem positioned relative to the faceplate such that the valve stem is received within faceplate, wherein the valve stem comprises an upper valve stem and a lower valve stem, wherein the upper valve stem and the lower valve stem are twistable coupled, wherein the upper valve stem being positioned relative to the faceplate such that the upper valve stem is received within the four-sided canal, wherein the lower valve stem being positioned relative to the faceplate such that the lower valve stem is received within the hollow canal.

As another of the many possible brief summaries of the nature and substance of the inventions claimed herein, the disclosure provides a method of disassembling a valve assembly of a dispensing apparatus, the valve assembly having a faceplate, the faceplate having a lower valve member and an upper valve member comprising decoupling the upper valve member from the lower valve member, the upper valve member positioned relative to the faceplate such that the upper valve member is received within a rectangular channel of the faceplate, the lower valve member positioned relative to the faceplate such that the lower valve member is received within a tubular channel of the faceplate; removing the upper valve member from the faceplate; and removing the lower valve member from the faceplate.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 10A illustrates a perspective view of another of various embodiments of a seal element, suitable for use as a beater seal element, in accordance with certain teachings set forth herein.

FIG. 10B illustrates a sectional side view of another of various embodiments of a seal element, suitable for use as a beater seal element, in accordance with certain teachings set forth herein.

FIG. 10C illustrates a section side view of portion of another of various embodiments of a seal element, suitable for use as a beater seal element, in accordance with certain teachings set forth herein.

Figure 1A:
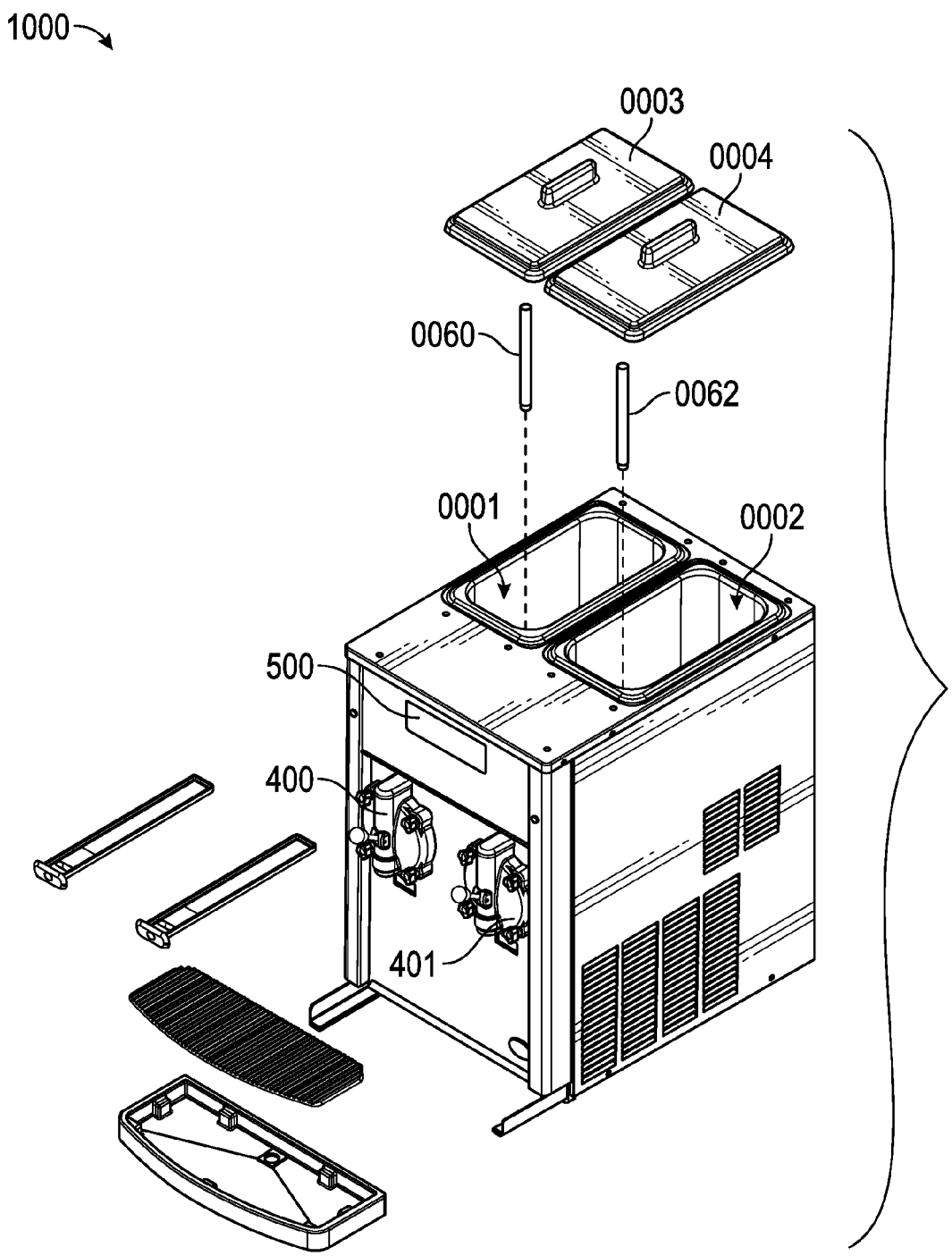
FIGS. 1A-1C illustrate at a high level an exemplary frozen product dispenser constructed in accordance with certain teachings set forth herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Figure 1B:
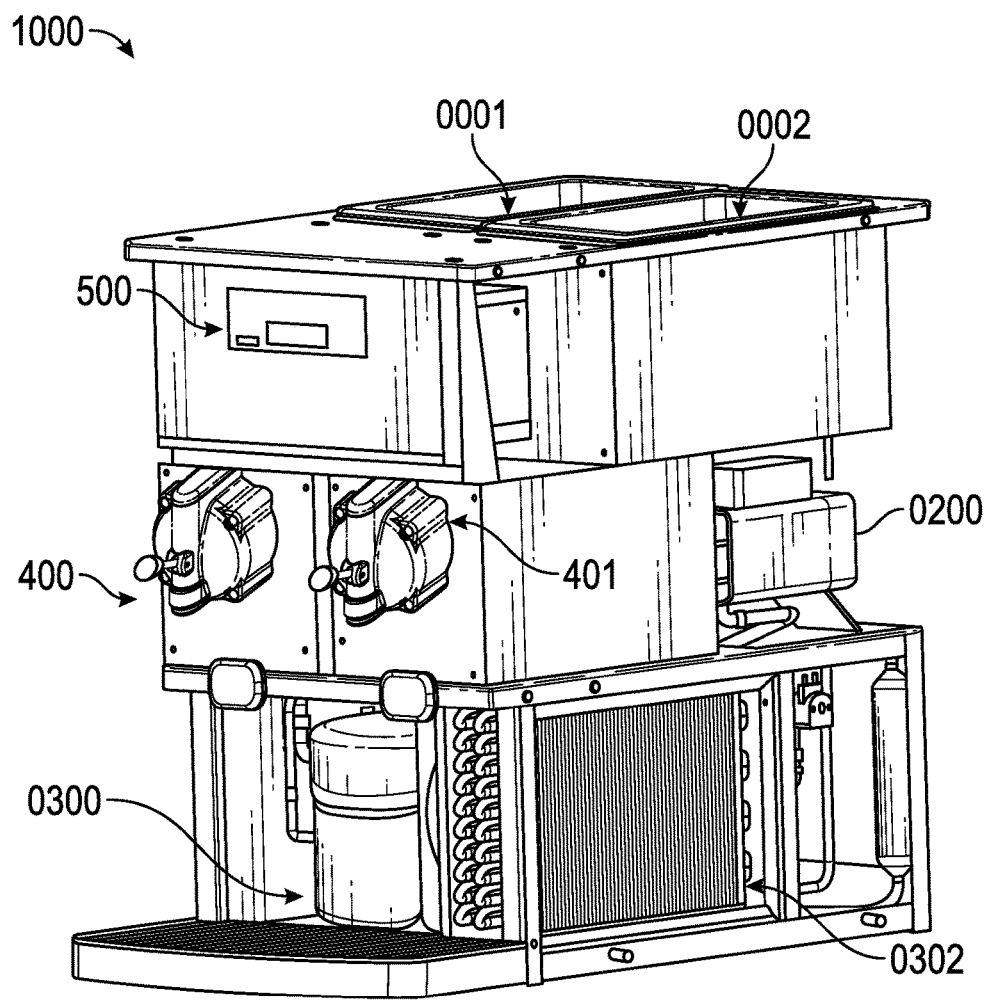
Figure 1C:
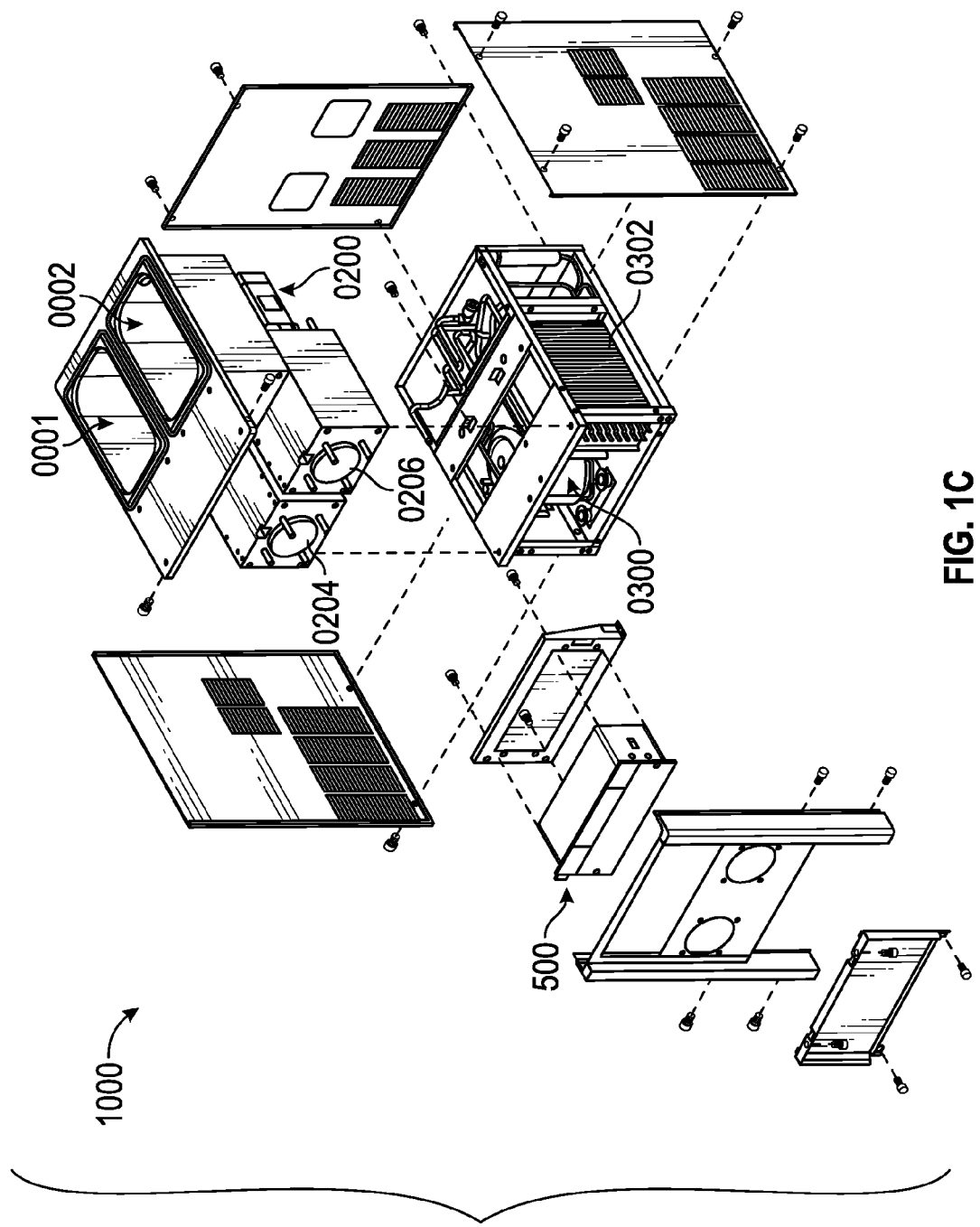

Turning to the drawings and, in particular, to FIGS. 1A, 1B and 1C aspects of an exemplary frozen product dispenser 1000 are illustrated. For purposes of the following discussion, the product to be dispensed by the frozen product dispenser 1000 will be described in the context of a dairy-based food product, such as a soft service ice cream product or a frozen yogurt product. It should be understood, however that—unless explicitly so indicated—the teachings, disclosure and recitation of claimed subject matter set forth herein is not limited to food products generally, or to dairy-based food products specifically, and that the teachings and disclosed embodiments discussed herein may be beneficially used in connection with other food products and with non-food products.

For purposes of easy discussion, at a high level, the illustrated frozen product dispenser 1000 may be considered as including four basic operational systems.

Initially, the illustrated frozen product dispenser 1000 includes a product storage system that includes basins in the form of hoppers 0001 and 0002 that are designed to receive and store the product to be frozen and dispensed. Access to the hoppers 0001 and 0002 may be provided via removable lids 0003 and 0004 and product to be frozen and dispensed may be poured into the hoppers 0001 and 0002. As described in more detail below, in the illustrated exemplary system, the product storage system may include components to (i) quickly bring the product in the hoppers 0001 and 0002 to a desired temperature, (ii) to maintain the product in the hoppers at a desired temperature and (iii) to control the flow of heat into and from the contents of the hopper so as to subject the contents to various processes—such as a pasteurization process. In addition, the product storage system may include sensors and systems for detecting, directly and/or inferentially, the level of product in the hoppers 0001 and 0002 to alert the operator of the frozen product dispenser when the contents are low and/or in a condition wherein dispensing should be halted.

In addition to the product storage system, the illustrated frozen beverage dispenser further includes a product freezing system that includes one or more freezing barrels 0204 and 0206 that receive product from the hoppers 0001 and 0002 and freeze the product for subsequent dispensing. In the illustrated embodiment, the product freezing system also includes a rotating scraper or beater positioned inside the freezing barrels (not specifically illustrated in FIGS. 1A-1C) that are driven, in a controlled manner, by drive motors (one of which 200 is illustrated in FIG. 1B). Additional details of the product freezing system are provided below.

The illustrated frozen product dispenser 1000 further includes a refrigeration system that includes a compressor 0300 and a condenser 302. In operation, the refrigeration system, provides compressed refrigerant at a high pressure to evaporator coils within the product storage system and the product freezing system to cool the stored product and/or freeze the product in the freezing system, and receives saturated gas from the evaporator coils that is then compressed, passed through the condenser, and provided to the product and storage systems to repeat the refrigeration cycle.

Further, the illustrated frozen product dispenser includes a dispensing and interface system that includes dispensing valves 400 and 401 and a control and man-machine interface 500. As described in more detail below, the dispensing valves 400 and 401 may be actuated to dispense frozen product from the freezing barrels and/or locked out to prevent the dispensing of product. The man-machine interface 500 may be used to permit configuration of the frozen product dispenser 1000 and/or the input of data that can be used to control the operation of the dispenser. It can also be used to provide notices and information from the dispenser to the operator of the frozen product dispenser.

It will be appreciated that the four systems described above are not necessarily isolated from each other and that the placement of a specific physical component within one system is to, some extent, arbitrary. For example, the evaporator coil used to cool the contents of the hoppers 0001 and 0002 could almost equally be considered part of the product storage system or the refrigeration system. The references to the various systems contained herein should, therefore, not to be considered physical aspects of the described frozen product dispenser 1000, but rather concepts useful in describing various aspects of the structure and operation of the exemplary systems, methods and apparatus discussed herein.

As reflected most specifically in FIG. 10 the frozen product dispenser also includes various support and shrouding elements that are not specifically numbered or discussed but will be understood to form part of the dispenser structure.

Figure 2A:
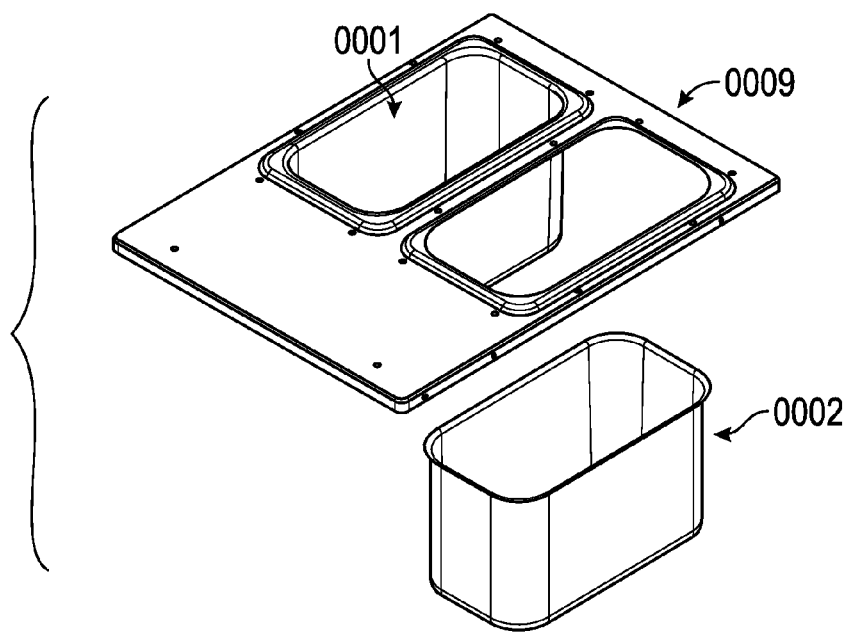
FIGS. 2A-2C illustrate various details of the product storage system in accordance with certain teachings set forth herein.
Figure 2B:
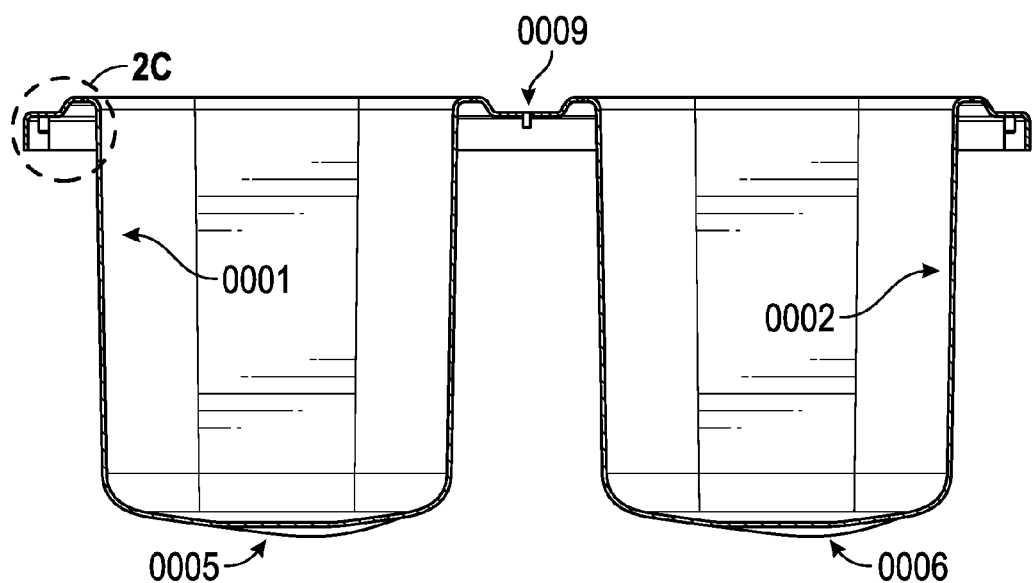
Figure 2C:
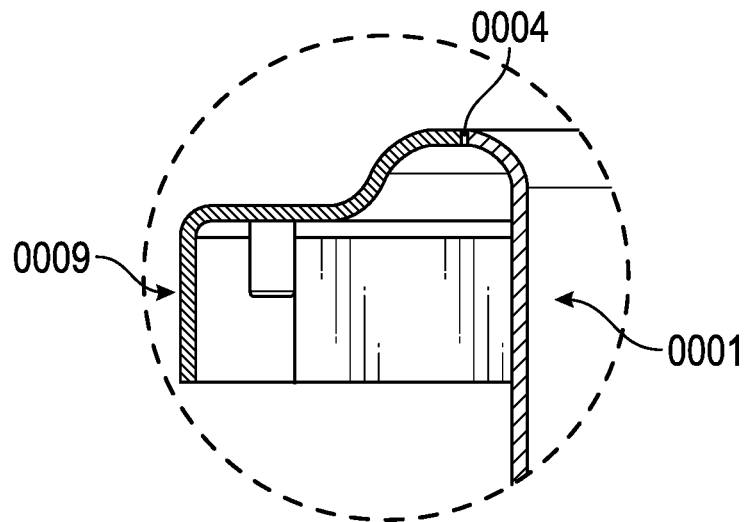

Certain details of the product storage system are generally provided in FIGS. 2A-2C.

As reflected in FIG. 2A, the exemplary product storage system includes hoppers 0001 and 0002 which, in the illustrated example, are in the form of stainless steel basins. Each of the hoppers 0001 and 0002 is mounted to a common support panel 0009. As reflected most clearly in FIG. 2C, the edges of the hoppers 0001 and 0002 are raised and are coupled to raised edge of the mounting panel 0009 at a raised point. To avoid any sharp edges and for purposes of appearance, the interface between the hoppers 0001 and 0002 and the mounting panel 0009 may be processed to provide a polished finish.

As reflected in FIG. 2B, each of the hoppers 0001 and 0002 is formed to provide a low point 0005 and 0006 and a funnel-like structure that narrows towards the low point. Although not clearly shown in FIGS. 2A-2C an opening is provided at the low point of each hopper. This design thus results in gravity feeding product placed into the hoppers 0001 and 0002 to, and through the openings at the low points, thus allowing the gravity-fed filling of product from the hoppers 0001 and 0002.

In many applications, a shroud in the form of a box-like structure is used to surround the hoppers 0001 and 0002 (not illustrated in FIGS. 2A-2B).

In certain embodiments of the illustrated dispenser, multiple sensors will be used to detect the level of product within the hoppers. In these applications, one sensor will generally be positioned at a level reflecting of a known volume of product corresponding to a level where the product in the hopper may need to be replenished. This level is generally known as the PRODUCT LOW level sensor. In these applications, a second sensor is provided at a level corresponding to a lower level of product in the hopper and, in one embodiment, a level at which the product in the hopper is so low that dispensing of the frozen product from the hopper should be discontinued. That level is generally known as the SOLD OUT level.

Alternate embodiments are envisioned wherein improved sensor system is provided in which a single sensor is used in conjunction with a predictive system to provide both "Low" and "Sold-Out" level information. Aspects of that improved system are shown in FIGS. 3 and 4.

Figure 3:
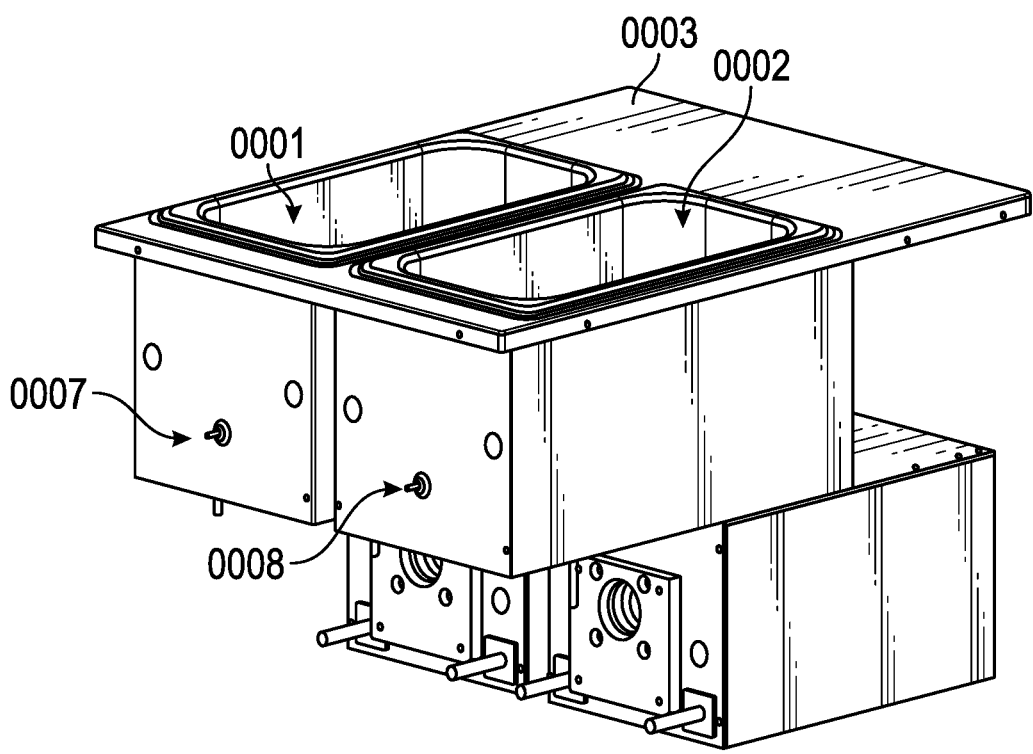
FIGS. 3-4 illustrate one embodiment of a frozen product dispenser in which a single sensor is used to detect a first level of product in hoppers and a predictive control processes is used to determine when the level of product has reached a second, lower level in accordance with certain teachings set forth herein.
Figure 4:
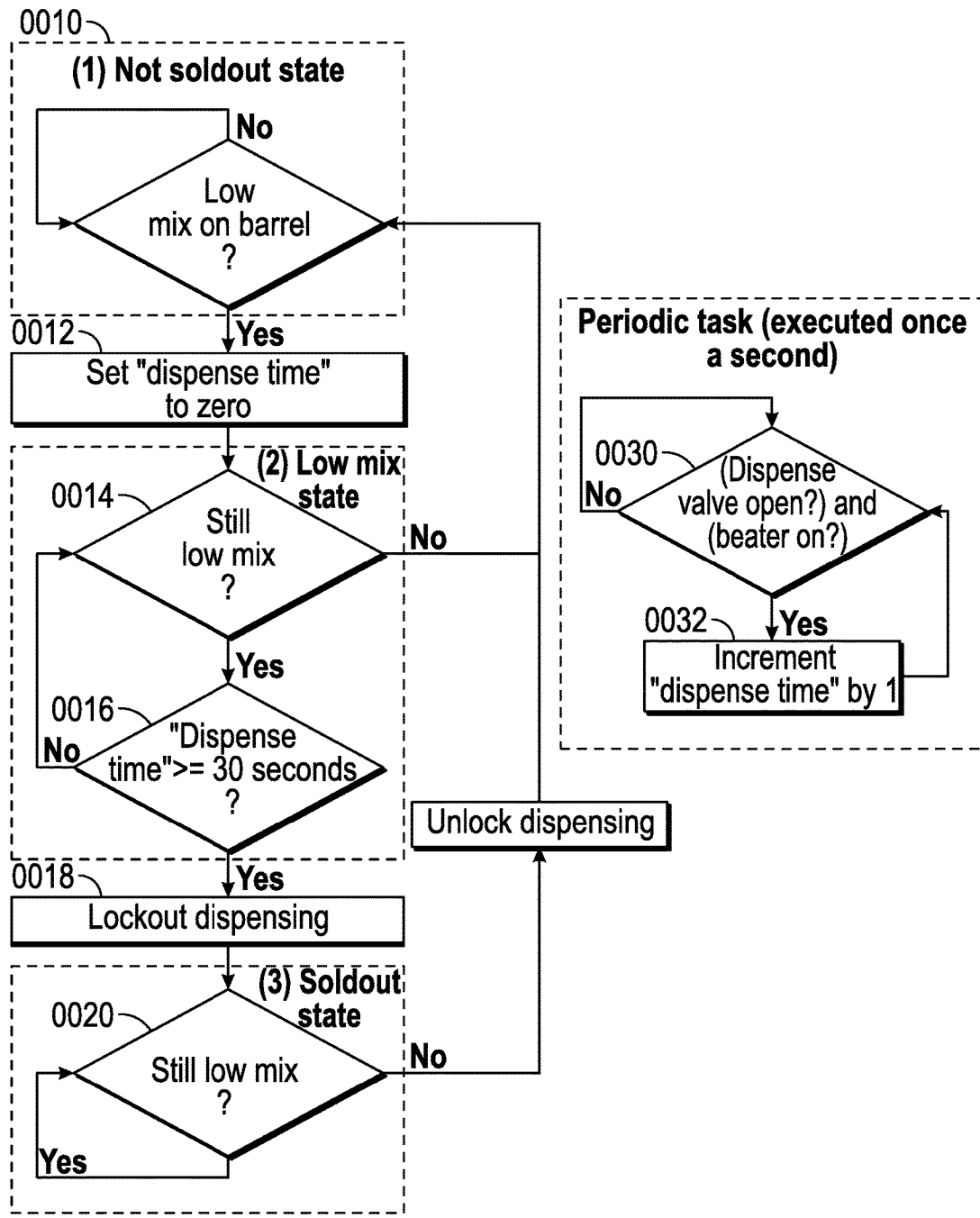

Referring to FIG. 3, two hoppers 0001 and 0002 are illustrated. An opening in each hopper is provided to receive a single sensor 0007 and 0008. The sensors 0007 and 0008 may make take various forms and can be capacitance sensors, infrared sensors, acoustic sensors, mechanical float sensors or any other suitable sensors. In the illustrated example, the sensors 0007 and 0008 are resistive sensors whose output varies between two states, one corresponding to a situation where the sensor is covered with product in the hopper, and the other where the level of product in the hopper has dropped to a level such that the sensor is no longer covered with the product to be dispensed.

In the illustrated embodiment of FIG. 3 the sensors 0007 and 0008 are mounted to detect when the product in the hopper has reached known state corresponding to a known quantity of product in the hopper. In the illustrated example, the sensors 0007 and 0008 are placed at a location where, for each hopper, a known amount of product (e.g., one gallon) is in the hopper at the point that the sensor detects the absence of product (i.e., at the time when the level of product first falls below the sensor). Notably, in the illustrated example, no "SOLD OUT" sensor is provided. The level at which the sensors 0007 or 0008 first detect the absence of product is described herein as the PRODUCT LOW level.

In the embodiment of FIG. 3, a predictive control approach is used to determine if, and when, to issue a SOLD OUT notification. In general, in this embodiment, various parameters associated with the operation of the illustrated system are monitored to determine if, and when, after the detection of a PRODUCT LOW condition a SOLD OUT notification should be issued. The predictive control approach of this embodiment is generally illustrated in FIG. 4.

FIG. 4 illustrates a control algorithm that may take the form of a software routine operating on a microprocessor-based controller for the overall system. The controller may be part of the man-machine interface and control unit 500. In general, in the illustrated embodiment, the system will—after detection of a PRODUCT LOW condition—monitor the cumulative dispense time to determine if, and when, to issue a SOLD OUT notification. In the illustrated embodiment, the control system senses the state of the dispense valve (e.g., open-dispensing or closed-not dispensing) using a reed switch and magnet positioned in the dispense valve. (One embodiment of a dispense valve including these components is discussed herein below with respect to FIGS. 13A, 13B, 13C and 14). Alternate forms of detection could be used.

FIG. 4 illustrates the manner in which the system will operate with respect to a single hopper associated with a single dispense barrel. If additional hoppers/barrels are included in the system the process will need to be modified to account for the additional hopper/barrel combinations.

Referring to FIG. 4 the exemplary control system of this embodiment initially looks at Step 0010 to determine, based on the information provided by one of sensors 0007 and 0008 whether the hopper in which that sensor is positioned at issue is in a PRODUCT LOW state. If not (meaning that the sensor continues to detect the presence of product, such that the product in the hopper is above the PRODUCT LOW state), the control system will loop back to Step 0010. If the PRODUCT LOW state is detected, the system will set a variable (DISPENSE-TIME) to zero at Step 0012 and will then determine whether the system remains in the LOW state at Step 0014. If it does not (which would be the state in the hopper was replenished) the system will loop back to Step 0010.

In parallel with the actions described above, the system will maintain a running DISPENSE-TIME count through the operation of the processes corresponding to Steps 0030-0032. These steps are executed on a priority basis by the system and, in one example, are executed every second. The DISPENSE-TIME routine first determines at Step 0030 whether the system is dispensing. It does this by determining whether the conditions required for product dispense are met which, in the example, means that the Dispense Valve is in its OPEN state and the Beater is ON (meaning that the dispense auger is operating to dispense product). If it is determined in Step 0030 that the system is dispensing, the DISPENSE-TIME count will be incremented by one-second at Step 0032.

Referring back to Step 0014, if the control system determines that the system remains in the PRODUCT LOW state, it will then determine at Step 0016 whether the cumulative DISPENSE-TIME value is at a level corresponding to a SOLD OUT state. In the illustrated example, the DISPENSE-TIME value corresponding to a SOLD OUT state has been arbitrarily set at 30 seconds for purposes of discussion.

If the control system determines at Step 0016 that the cumulative dispense time is below the time that would have depleted the volume of product that existed when the PRODUCT LOW state was first detected (i.e., if it appears that there is still product to be dispensed), the control system will look back to Step 0014 and the process described above will be repeated. If, however, the control system determines that the cumulative DISPENSE-TIME is at or above the DISPENSE-TIME threshold, which in the example is 30 seconds, the control system will then issue a SOLD OUT notification (e.g., by illuminating a light and/or, in embodiments where the control system has network connection, sending a text or e-mail message to one or more system operators). In the illustrated embodiment, the system will further lockout the dispensing of product from the barrel at issue at Step 0018 by activating an actuator associated with the relevant dispensing valve. An alternative embodiment of the lockout is a software lockout in which the control system will not turn ON the motor 0200 or 0202 whenever the dispense valve is determined to be opened. Locking out of the dispense valve associated with the product at issue when the amount of product in the hopper is at or below a level corresponding to the SOLD OUT level—despite the fact that there may still be product in the freezing barrel—may be beneficial because: (a) it prevents the dispensing of a product that may have undesired quality characteristics; (b) it prevents over-freezing of the product; and (c) continued dispensing may cause the compressor to run continuously.

The DISPENSE-TIME threshold used to determine when to put the system in a lockout state and/or to issue a SOLD OUT notification may be set in a variety of ways. In one embodiment, the DISPENSE-TIME THRESHOLD may be pre-set to be a fixed value known to provide a safe margin between when the PRODUCT LOW state is first detected and when the system reaches the point where Lockout is desired. For example, consistent with the example described above, a DISPENSE-TIME THRESHOLD of 30 second could be set.

In alternate embodiments, the DISPENSE-TIME Threshold may be set dynamically based on a variety of factors including: (1) the speed of the dispensing auger inside the freezing chamber; (2) the geometry of the dispensing auger; (3) the type of product being dispensed; and (4) the expansion of the product being dispensed upon freezing. The first two factors are generally fixed with respect to a given dispensing system and can be set or configured once the auger speed and auger geometry are set. The remaining two factors—product type and product expansion—however, are product specific and can vary depending on what product(s) are placed in the hopper. Embodiments are envisioned where the product type and product expansion factors can be set by either: (1) having the system operator key-into an interface data reflecting the specific product to be placed in the hopper (where each product is associated with a given expansion value); (2) having the system operator key-into an interface data reflecting the expansion of the dispensed product; (3) the product container can include a machine readable code (e.g., a QR code, RFID code, or bar code or the like) that can be read by the system such that the product and expansion data can be looked up or selected; and/or (4) using dedicated fill-tubes/mix-tubes 0060 and 0062 such that the changing of a fill-tube 0060 and 0062 in the hopper will provide information (mechanically or electronically) either about the product to be placed in the hopper and/or the expansion of the product to be placed in the hopper. In these embodiments, once the factors set forth above are determined, the controller could calculate the desired DISPENSE-TIME threshold.

Once the system is placed in a Lockout state, the control system will repeatedly determine, at Step 0020, whether the system remains in the LOW MIX state. If it does, it will loop back to Step 0020. If it does not, which would be the state if the hopper at issue was replenished, the system will unlock the dispensing valves at Step 0020—thus permitting dispending of the product—and loop back to Step 0010 to restart the sequence.

Hopper Cooling System

As previously discussed, in the illustrated frozen product dispenser 1000, hoppers are provided for the receipt and storage of one or more products, which may be food products, to be frozen and dispensed by the system. The food item may take a variety of forms but not limited to dairy-based items such as soft-serve ice cream and/or dairy products. Because certain food products, including dairy products, can provide a media in which bacterial growth can occur, a cooling/heating structure may be included within the product storage system to cool the contents of the hopper to a point where bacterial growth is prevented or inhibited and/or heat and cool the contents of the hopper to various temperature levels to perform a pasteurization process to kill any bacteria in the product and/or inhibit further bacterial growth.

In one embodiment of the exemplary frozen product dispenser 1000, the heating/cooling structure may take the form of an evaporator coil, spiral wound about each hopper individually or the two hoppers collectively, coupled to a refrigerant compressor, such that expanding refrigerant passes through the evaporators to remove heat from the hopper contents and/or hot gas is passed through the evaporators to add heat to the hopper contents. Alternate embodiments are envisioned wherein unique evaporator coil shapes are used to promote efficient cooling/heating of the hopper contents and/or where thermally conductive plates are used to increase the efficiency of the cooling and heating operations associated with the hopper contents. Aspects of one such alternate embodiment are reflected in FIGS. 5A and 5B.

Figure 5A:
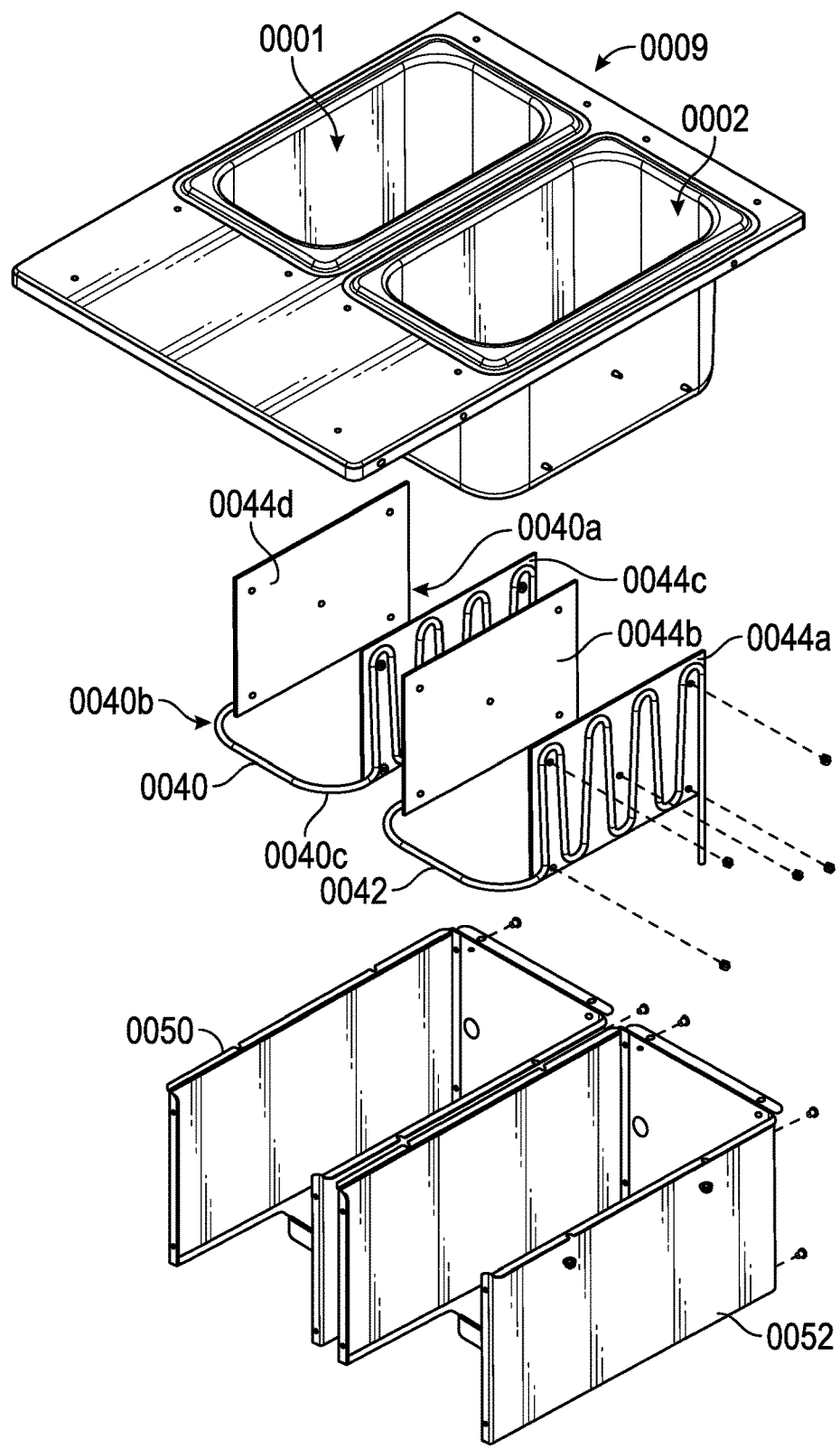
FIGS. 5A-5C illustrate at a high level an exemplary frozen product dispenser constructed in accordance with certain teachings set forth herein.
Figure 5B:
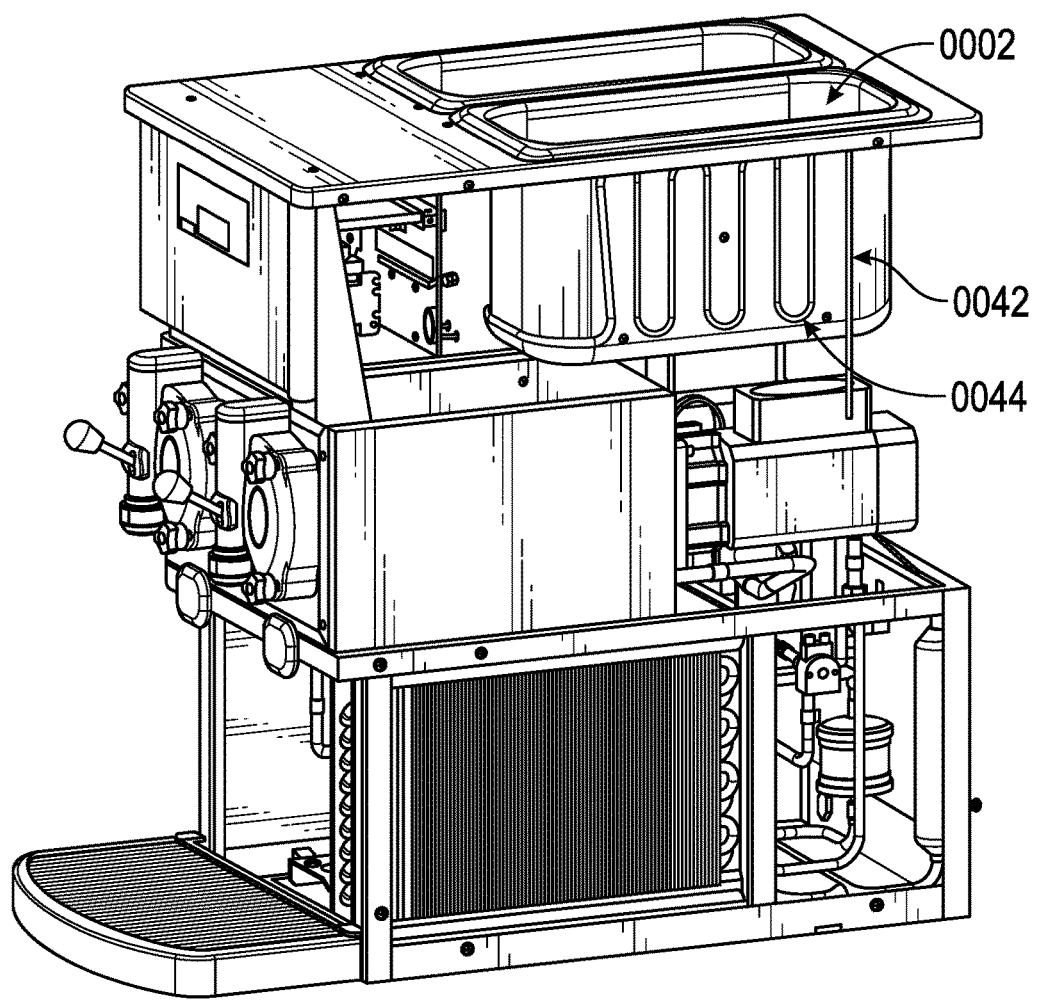
Figure 5C:
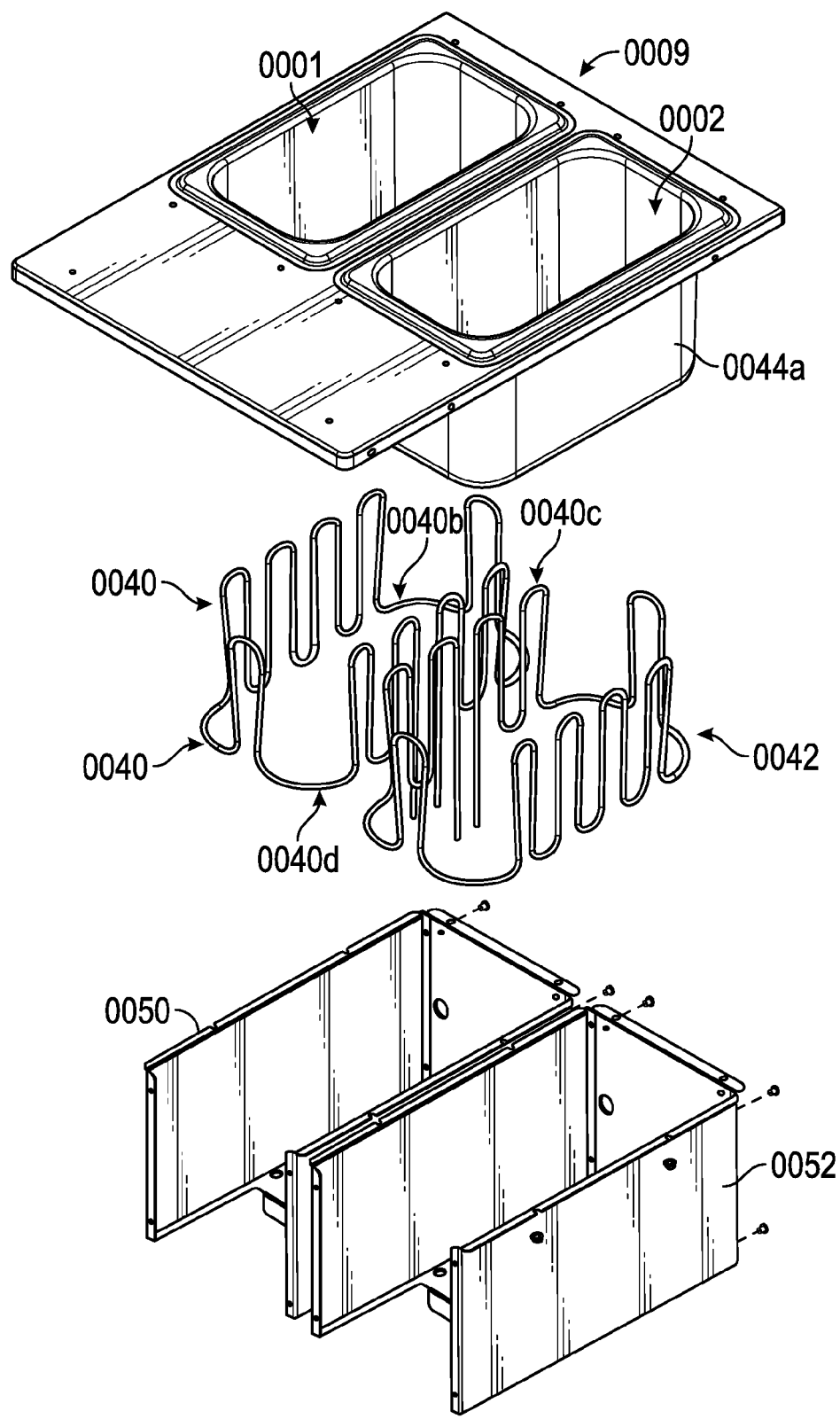

Referring to FIGS. 5A, 5B, and 5C an improved cooling and/or heating structure for use in a product storage system is illustrated. In general, the illustrated embodiment includes product storage hoppers 0001 and 0002, constructed as described above, and two serpentine-shaped evaporator coils 0040 and 0042. As reflected in the figure, each of the serpentine evaporator coils 0040 and 0042 is constructed such that the majority of the coil runs vertical from the top to the bottom of the hopper around which the coil is placed and the minority of the coil runs generally horizontally with respect to such hopper. Further, each serpentine coil is constructed such that the number of "bends" where the coil is bent around the corners of the hopper is limited to the number of corners exhibited by the hopper. For example, coil 0040 is placed about hopper 0001. Coil 0040 has three bends (0040*a*, 0040*b*, and 0040*c*). FIG. 5C is an alternative embodiment showing the serpentine evaporator coils 0040 and 0042 in a second configuration. Coil 0040 has four bends (0040*a*, 0040*b*, 0040*c* and 0040*d*) which is equal to the number of corners of hopper 0001. Alternative coil configurations could be used.

The use of serpentine coils as reflected in FIGS. 5A, 5B and 5C provides several benefits over the more traditional spiral-wrapped approach of placing an evaporator coil about a hopper. As one example, it is difficult to ensure proper contact between an evaporator coil and a flat (or nearly flat) surface of a hopper where bends occur. Because the use of serpentine coils like those shown in FIGS. 5A, 5B and 5C results in minimal bends of the evaporator coil, the area in which it is difficult to maintain proper contact between the evaporator coil and the hopper is reduced. Further, the use of serpentine coils where the majority of the coil is vertically arranged with respect to the hopper permits better and more efficient cooling of the product in the hopper than would be available if the majority of the coils ran in the horizontal direction.

In certain embodiments, the serpentine coils 0040 and 0042 may be coupled directly to the exterior surfaces of hoppers 0001 and 0002 through soldering, brazing, or mechanical techniques. In such embodiments, thermally conductive paste or material may be used to promote the flow of heat to/from the evaporator coils and the hopper contents. Other embodiments are envisioned where thermally conductive plates are attached to the outside walls of the hoppers 0001 and 002 and where the evaporator coils 0040 and 0042 are coupled to the outside of these thermally conductive plates. FIGS. 5A and 5B illustrate one such embodiment.

In the embodiment of FIGS. 5A and 5B, thermally conductive plates—for example in the form of generally rectangular aluminum plates—are coupled to the outside sides of the hoppers 0001 and 0002. In the illustrated example, of FIGS. 5A and 5B, two thermally conductive plates 0044*a*, 0044*b*, 0044*c*, and 0044*d* are provided (on the outside of hoppers 0001 and 0002). Alternate embodiments are envisioned where two plates would be provided (positioned along the long sides of the hoppers 0001 and 0002) or where a different number of plates are provided, such as eight plates for along the long sides of the hoppers and four along the short sides of the hoppers. In the illustrated example, the thermally conductive plates are affixed to the side of the hoppers mechanically with a thermally conductive paste filling the gaps between the plate and the hopper material. In the illustrated example, shrouds 0050 and 0052 (in the form of a box-like structure) may be used to surround the hoppers 0001 and 0002, plate 0044, and serpentine coils 0040 and 0042.

In use, the thermally conductive plates of the type illustrated in FIGS. 5A, 5B, and 5C, both increase the effective thermal area of the surface through which heat is removed/supplied to the contents of hopper and even out the temperature gradients in the wall of the hopper. In use, heat will flow to/from the evaporator coils 0040 and 0042 through the cross section of the thermally conductive plate substantially easier than through the stainless steel, air, or thermal compound. The temperature gradient on the surface of the thermally conductive plate will, therefore, ideally be minimal. Because the surfaces of this thermally conductive plates are pressed up against the outside of the hopper walls, with thermal compound between the surfaces to promote even contact area, the thermal gradient on the walls of the hopper will be more even, translating to an even more even gradient on the inside surface.

Analysis has shown that using a thermally coupled plate as described above in conjunction with a serpentine hopper evaporator coil, results in an increase in the minimum temperature that the cooled areas need to maintain the food product within the hopper at desired levels over what would be required if more traditional evaporator coil placements were used. This means that a frozen product dispenser using the described approach can be operated more efficiently, with less energy usage, than a dispenser using a more conventional approach can.

For example, using a standard wrapped-coil approach, the temperature at the cooled area for a given system would need to be maintained at 26.49 F to maintain a food product in the hopper at a desired temperature of 41 F (in 70 F ambient). Under similar circumstances, using the thermally conducive plate and the serpentine evaporator coil described above, the temperature at the cooled are would need to be maintained only at 39.34 F. That temperature is only slightly below the desired temperature of the food product and demonstrates the increased heat transfer capacity of the approach described herein. This means that ice buildup in the hopper will not be an issue with the described design. Further, the increase in heat transfer capacity associated with the design means that the time required to cool a food product placed into the hopper to a desired temperature (or the time required to elevate the temperature of the food product during pasteurization) will be substantially reduced.

In one embodiment, the heat conductive plates are flat and the hopper evaporator coils are mounted directly to an exterior surface of the flat plates. In another example, the thermally conductive plates are relatively thick (i.e., three times the thickness of the plate in the first example) and are machined to provide a serpentine recessed groove in which the serpentine evaporator coils are positioned. The primary purpose of the machined grooves is to increase the contact area between the copper and the plate and to provide more cross sectional area for the heat to flow, therefore being less thermally resistive.

It will be appreciated that the described approach of using a thermally conductive plate in combination with an attached serpentine evaporator coil is not limited to systems for dispensing a frozen product but may be beneficially used in connection with any device where a product must be contained in a holding volume where the walls are made of a material that is relatively thermally insulative but high rates of heat transfer through the walls are desired.

Because the thermally conductive plates permit a high degree of heat transfer through the walls of the hopper, it is potentially possible—for certain food products—to pour the food product into the hopper at room temperature and to rapidly and safely bring the thermal contents of the hopper (which will include the cooled product originally in the hopper and the added room temperature product) to the desired cooled temperature. This rapid cooling operation can be used instead of the traditional approach of pre-chilling product to be added to the hopper.

The rapid cooling operation described above can be accomplished by the user of the system indicting—through operation of the man machine interface 500—that a rapid cooling operation is required. In response to this indication, the control system for the frozen product dispenser 1000 can run the system to withdraw a substantial amount of heat form the system by, for example, passing compressed refrigerant through the hopper evaporator coils for a longer period of time than would normally be required to maintain the product within the hopper at the desired level.

As described above, the product storage system feeds product unto a product refrigeration system. The product refrigeration system for the exemplary frozen product dispenser of FIGS. 1A-1C is illustrated in FIG. 6.

Figure 6:
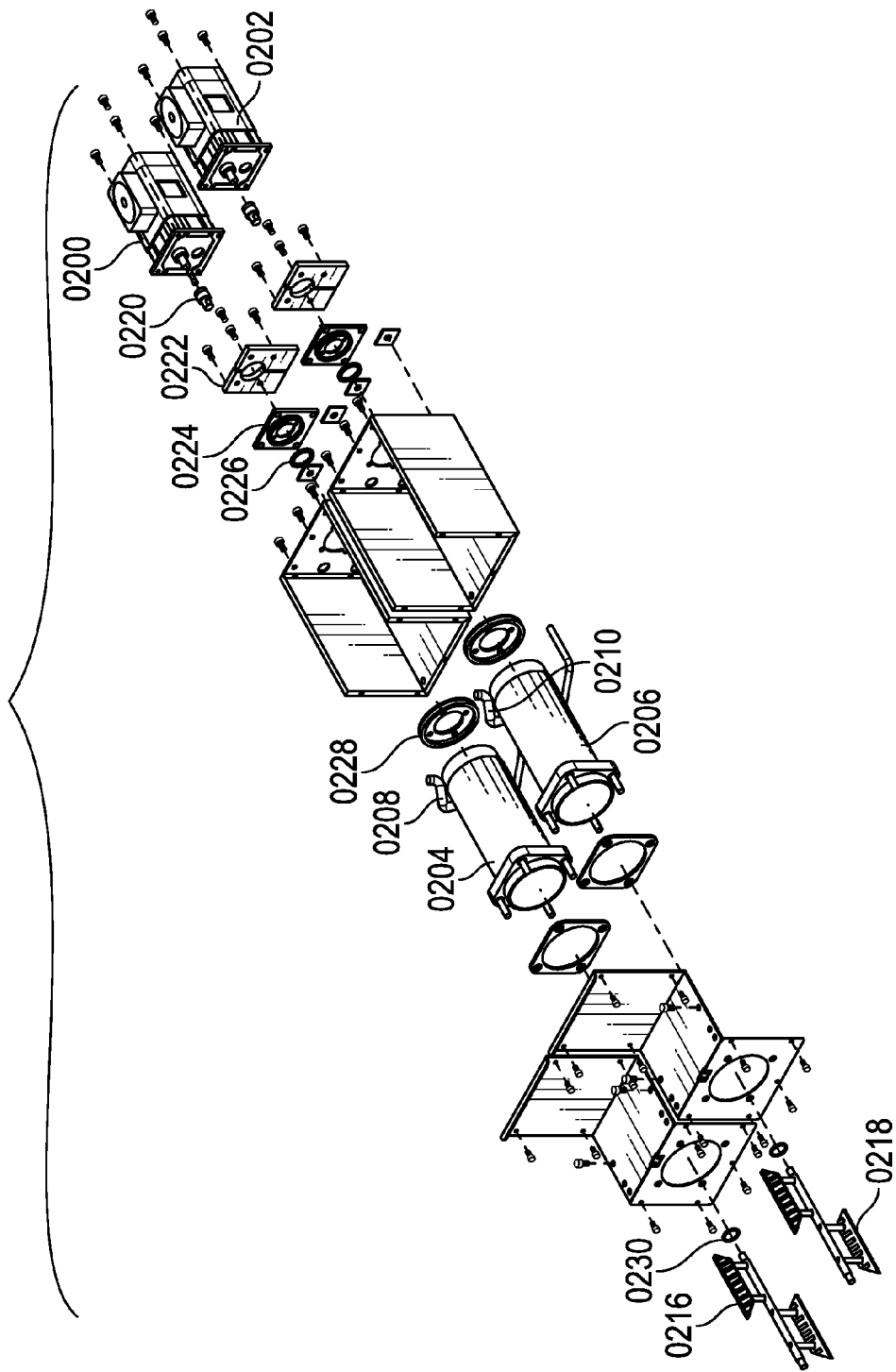
FIG. 6 illustrates an exemplary product refrigeration system of the exemplary frozen product dispenser of FIGS. 1A-1C in accordance with certain teachings set forth herein.

Referring to FIG. 6, an exemplary product refrigeration system is illustrated. The exemplary system includes two freezing barrels 0204 and 0206. Each freezing barrel includes an inner tubular structure surrounded by a barrel evaporator and an outer tubular structure. In accordance with this design, for cooling operations, compressed and expanding refrigerant flows into one side of the barrel evaporator, expands as it passes through the barrel evaporator and absorbs heat form the interior of the freezing barrel, and exits the barrel evaporator coil as a saturated vapor.

Product from the hoppers 0001 and 0002 is fed into the freezing chambers within the freezing barrels 0204 and 0206 through side-fill connectors 0208 and 0210. The side-fill connectors 0208 and 0210 are positioned at the far back of the freezing barrels 0204 and 0208 and are arranged so that product can flow, via the force of gravity, from the hoppers 0001 and 0002 into the freezing chambers of the freezing barrels.

Figure 7A:
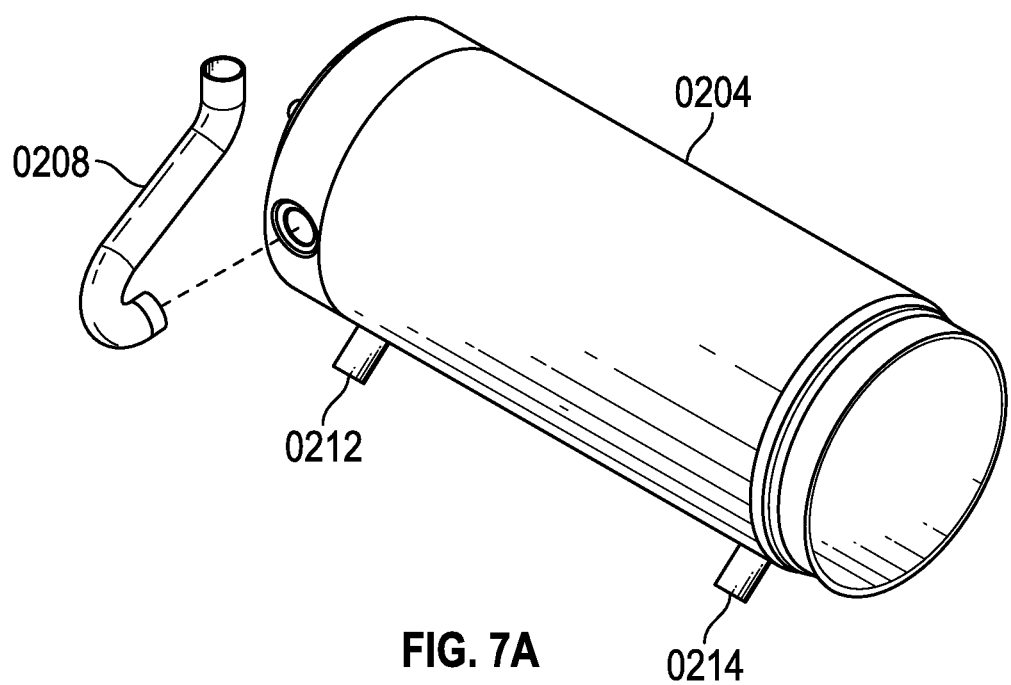
FIG. 7A illustrates a perspective view of an exemplary side-fill connector and a freezing barrel of the exemplary product refrigeration system of FIG. 6 in accordance with certain teachings set forth herein.
Figure 7B:
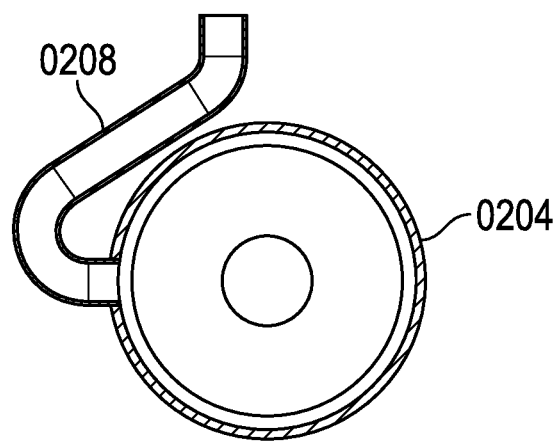
FIG. 7B illustrates a side view of an exemplary side-fill connector and a freezing barrel of the exemplary product refrigeration system of FIG. 6 in accordance with certain teachings set forth herein.
Figure 8A:
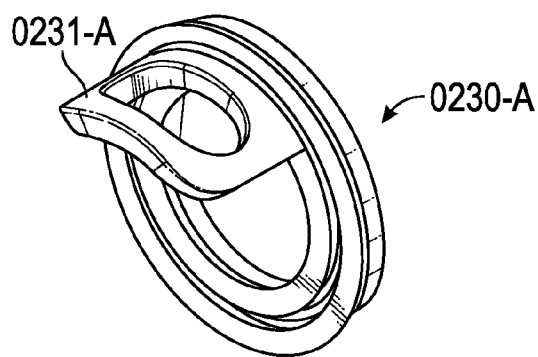
FIG. 8A illustrates a perspective view of one of various embodiments of a seal element, suitable for use as a beater seal element, in accordance with certain teachings set forth herein.
Figure 8B:
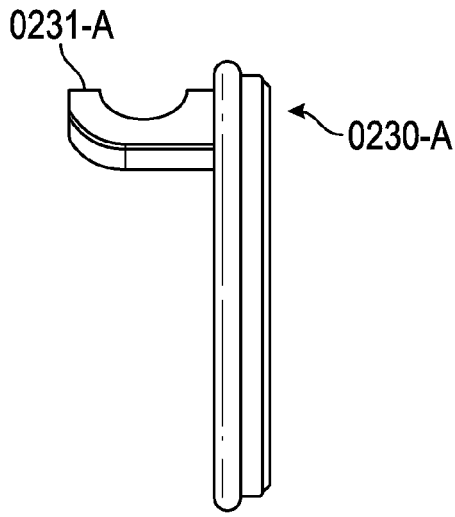
FIG. 8B illustrates a side view of one of various embodiments of a seal element, suitable for use as a beater seal element, in accordance with certain teachings set forth herein.
Figure 8C:
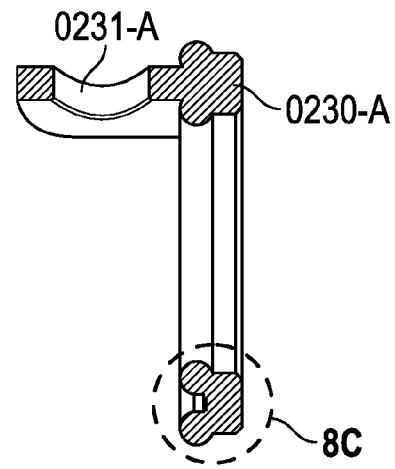
FIG. 8C illustrates a sectional side view of one of various embodiments of a seal element, suitable for use as a beater seal element, in accordance with certain teachings set forth herein.
Figure 8D:
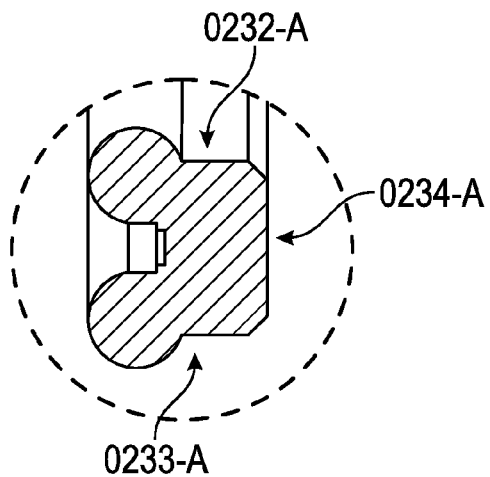
FIG. 8D illustrates a section side view of portion of one of various embodiments of a seal element, suitable for use as a beater seal element, in accordance with certain teachings set forth herein.
Figure 9A:
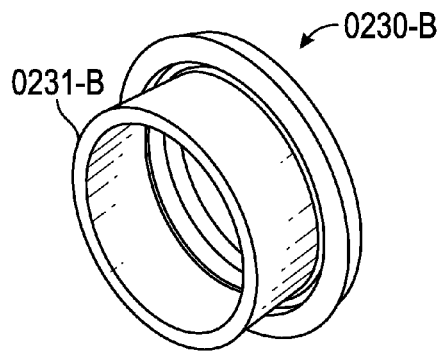
FIG. 9A illustrates a perspective view of another of various embodiments of a seal element, suitable for use as a beater seal element, in accordance with certain teachings set forth herein.
Figure 9B:
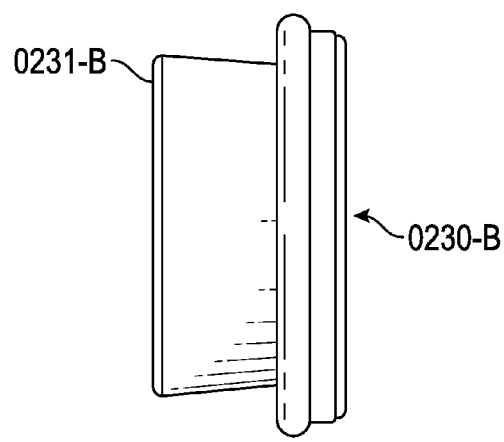
FIG. 9B illustrates a side view of another of various embodiments of a seal element, suitable for use as a beater seal element, in accordance with certain teachings set forth herein.
Figure 9C:
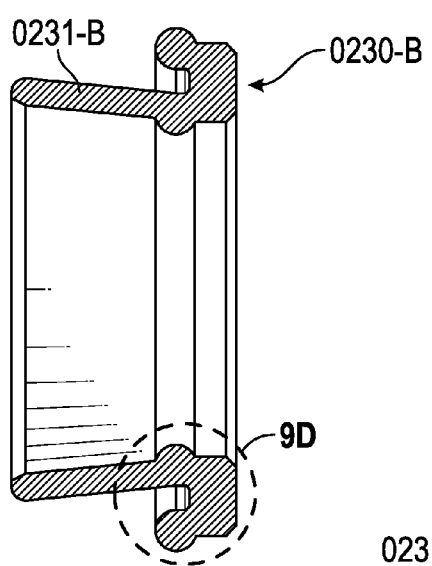
FIG. 9C illustrates a sectional side view of another of various embodiments of a seal element, suitable for use as a beater seal element, in accordance with certain teachings set forth herein.
Figure 9D:
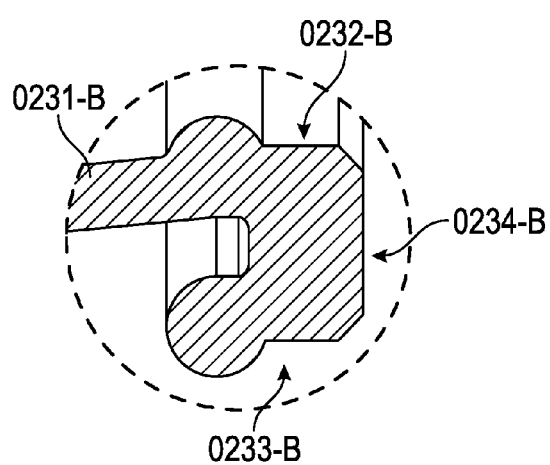
FIG. 9D illustrates a section side view of portion of another of various embodiments of a seal element, suitable for use as a beater seal element, in accordance with certain teachings set forth herein.

Details of the side-fill connectors 0208 and the freezing barrel 0204 are shown in FIGS. 7A and 7B. Side-fill connector 0210 and freezing barrel 0206 will have a similar construction.

Referring to FIGS. 7A and 7B, freezing barrel 0204 is illustrated. As described above, the freezing barrel 0204 will define an inner freezing chamber and will include a barrel evaporator coil through which refrigerant (or hot gas) may flow. The inlet and outlet for the barrel evaporator are illustrated as elements 0212 and 0214.

As reflected in the figures, the side fill connector 0208 is a tubular element that has one end coupled to an opening port into the freezing chamber of the freezing barrel 0204 and a second end that is coupled to the opening at the bottom of hopper 0001 (not illustrated in FIG. 7A or 7B). Through this connection, product will flow—via the force of gravity—from hopper 0001, through the side-fill connector and into the freezing chamber of freezing barrel 0208. As shown in the figures, side fill connector 0208 may be constructed so that the end of the connector coupled to the freezing barrel 0204 permits product to enter the freezing chamber within the freezing barrel 0204 at a point where the product will be flowing substantially horizontally with respect to the barrel 0204 and to permit product to enter the side-fill connector 0208 from the hopper 0001 at a point where the product will be flowing substantially vertically with respect to the freezing barrel. This arrangement is believed to allow for a very compact arrangement where minimal space is required to permit the desired flow of product.

The compact arrangement of FIGS. 7A and 7B permits the use of direct drive motors to drive a scraper and beater assembly, referred to herein as the beater assembly, positioned within the freezing chambers of the freezing barrels 0204 and 0206. The use of such direct drive motors is reflected in FIG. 6.

As shown in FIG. 6, beater assemblies 0216 and 0218 are positioned within the freezing chamber of each of the freezing barrels 0204 and 0206, respectively. Each beater assembly 0216 and 0218 includes an end that, as described in more detail below, is coupled to receive the output of one of the direct drive motors 0200 and 0202 such that operation of the direct drive motors 0200 and 0202 will cause rotation of the corresponding beater assembly 0216 or 0218.

The connection between the direct drive motors 0200 and 0202 and the beater assemblies 0216 and 0218 is reflected in FIG. 6. For purposes of illustration, only the connection between drive motor 0200 and beater assembly 0216 will be discussed in detail. It will be understood that a corresponding connection will be found between direct drive motor 0202 and beater assembly 0218.

As reflected in the figures, the direct drive motor 0200 includes an output shaft (not labeled in FIG. 6). That output shaft is coupled, via key connection, to a coupling element 0220 that may be formed, in part or in total of ceramic material. The coupling element 0220 is in turn coupled, through a motor plate 0222, motor plate insert assembly 0224, washer 0226 and rear gasket 0228 to one end of the beater assembly 0216. A beater motor seal element 0230 is provided at the point where the coupling element 0220 makes contact with the beater assembly 0216.

Maintenance of the seal provided by the beater seal element 0230 is important to proper operation of the frozen product dispenser 1000. As such, beater seal element 0230 must be a robust sealing structure that is capable of establishing and maintaining a good seal under a wide variety of conditions. Further, removal, inspection and replacement of the beater seal element 0230 must be possible and, preferably is something that can be readily accomplished without the need for tools or supporting structure. FIGS. 8A-8D, 9A-9D and 10A-10C illustrate various embodiments of seal elements, suitable for use as beater seal element 0230.

The various embodiments of beater seal element 0230 reflected in FIGS. 8A-8D, 9A-9D and 10A-10C all share some common characteristics. First, all embodiments incorporate features that can be readily grasped with human fingers to permit removal of the seal for inspection or replacement without the need for tools. Second, all embodiments include resilient members that, in use, can be tightly squeezed between the shaft coupling element 0220 and the walls of the freezing chamber within the freezing barrel in which the sealing element is positioned. Third, all embodiments are relatively complex in form and, unlike simple O-rings, provide two sealing surfaces joined by a structural ring. Fourth, the features design for grasping by the human hand are all located closer to the center of the sealing element than to its outer surface, such that pulling on the features will result in a rolling action that will tend to cause the sealing element to roll out of its position. Finally, in all embodiments, the graspable features are integrally formed with the other features of the sealing element and are made of the same flexible material as the remainder of the sealing element.

These, and other characteristics, may be further understood with respect to FIGS. 8A-8D. These figures illustrate an exemplary beater seal element 0230-A that includes a graspable feature 0231-A in the form of a ring-like structure with a ring opening sized sufficiently large to receive a human finger. As best reflected in detail in FIG. 8D, the seal element 0230-A defines two sealing surfaces, 0232-A and 0233-A and a structural ring 0234-A connecting the two sealing surfaces. The graspable feature 0231-A is positioned closer to the center of the element 0230-A such that pulling on the feature will be held in place, because the outer sealing element will be held in place in the barrel wall by an undercut therein (not illustrated in FIGS. 8A-8D). Similar to the embodiment of 0231-A in FIGS. 8A-8D, FIGS. 9A-9D illustrate embodiment 0231-B that is similar in construction to the embodiment of FIGS. 8A-8D, except that the graspable feature is in the form of a continuous flat extending ring for the 0231-A embodiment. Finally, FIGS. 10A-10C illustrate a third embodiment 0231-C. The graspable feature 0231-C is like those previously described, with the primary exception being that the graspable feature 0231-C is in the form of three extending tabs. For all of the preceding embodiments, like reference numbers correspond to like products. For example, references 0232-A, 0232-B and 0232-C all refer to generally corresponding sealing surfaces.

As described above, in addition to including a product storage system and a product freezing system, the frozen product dispenser of FIGS. 1A-1C also includes a refrigeration system that is used to provide compressed refrigerant (and or hot gas) to the barrel evaporator coils and to the hopper evaporator coils.

In certain embodiments, the refrigeration is illustrated as a split-system refrigeration that uses a single compressor to drive both: (a) the barrel evaporators and (b) the hopper refrigeration system. Among other things, this approach permits the construction of an economical, efficient, and relatively lightweight system. One challenge associated with such a split-system approach is that the temperature and pressure requirements for the compressed refrigerant to be provided to the hopper evaporators are different, and potentially, significantly different from those for the compressed refrigerant and in many instances significantly lower, than those associated with the barrel evaporator. For example, in certain applications, the freezing barrels will need to be maintained at sub-freezing temperatures (for the materials in the barrel) while the hoppers will need to be maintained at above-freezing temperatures. Such an application may require the barrels to have a low-side pressure for the refrigerant on the order of 45-65 PSI and the hoppers to maintain an above-freezing temperature, which would require a low-side pressure for the hopper evaporator coils in the range of 65-85 PSI.

In the embodiment of the refrigeration system of the described frozen product dispenser, an evaporator pressure regulator (EPR) is used to separate the two low-side pressure zones from each other. In such an embodiment, the hopper cooling will run constantly at all times when the compressor is running such that cooling of the barrels will also, necessarily result in cooling of the hoppers. This approach has a drawback in that it causes a parasitic type draw of refrigerant from the barrel evaporators, this decreasing the amount of cooling being delivered to the barrel evaporators and potentially lengthening the freezing time of the product.

In an alternate embodiment, EPRs are not used and the hopper evaporators are run separately from the barrel evaporators. This embodiment utilizes a shut off valve inline to the hopper refrigerant line such that the delivery of compressed refrigerant to the hopper evaporators can be controlled. This embodiment also utilizes a control system that gives priority refrigerant demand to barrel evaporators to ensure that the freezing of the product in the barrels is given priority. In this embodiment, whenever it is determined that the barrel needs to be refrozen, the shutoff solenoid to the hopper evaporators remain closed thus ensuring that all of the refrigerant from the compressors is provided to the barrel evaporators. After this freezing process is complete and the controller determines the necessity, the expansion valves to the barrel evaporators are closed and the shut off to the hopper evaporators opens. If the hoppers are in the middle of a cooling operation, and the controller determines that a barrel freezing process is necessary, the hopper cooling is stopped and the barrel freezing is started immediately. Once the freezing operation is complete, the hopper cooling process continues.

Figure 11:
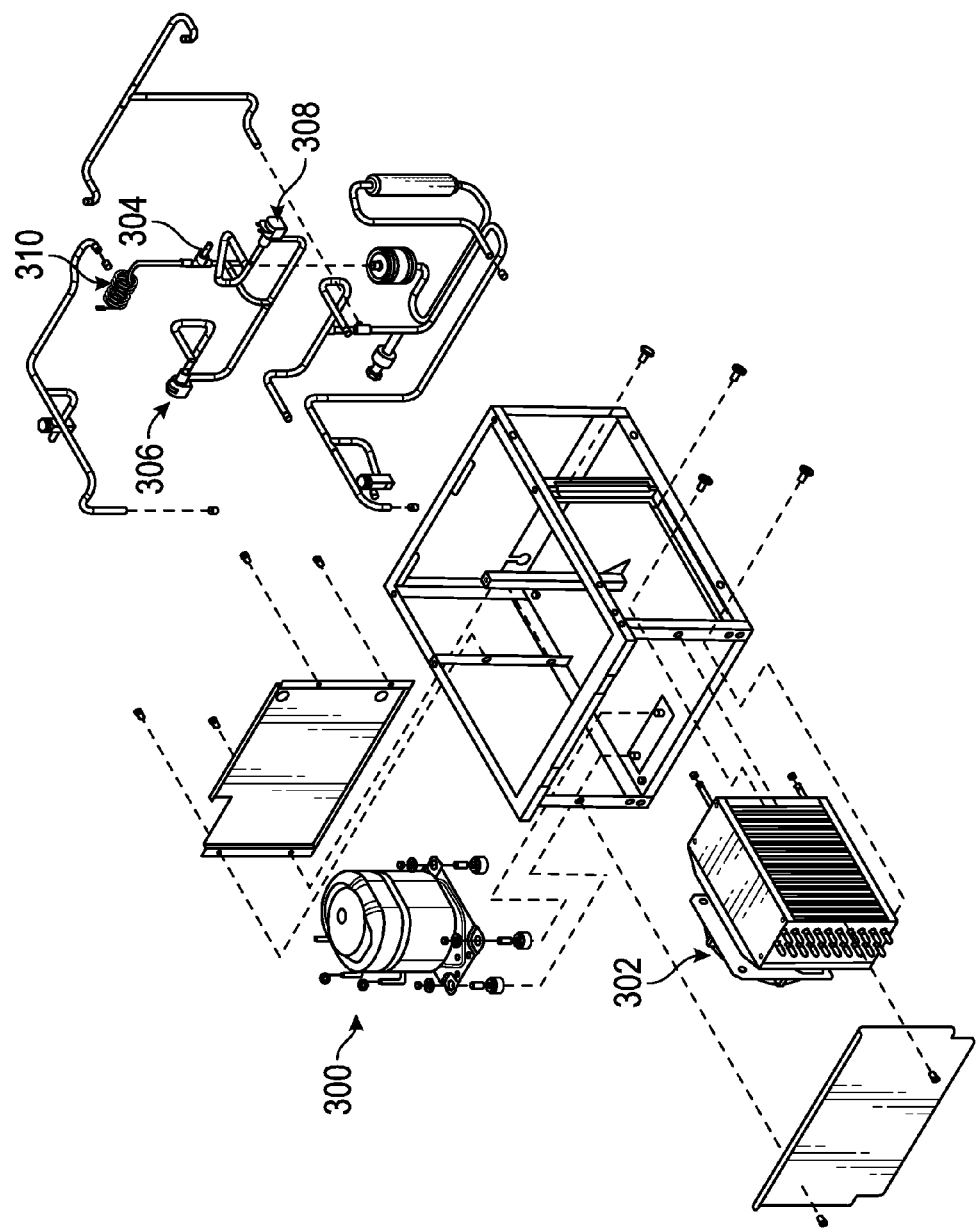
FIG. 11 illustrates an exemplary split refrigeration system of the exemplary frozen product dispenser of FIGS. 1A-1C in accordance with certain teachings set forth herein.

Turning to FIG. 11, an exemplary split refrigeration system is illustrated. It includes a compressor 300 that receives saturated vapor and compresses it to provide hot, compressed vapor that in turn, is passed through a condenser 302 to produce liquid refrigerant that is provided at a high pressure state to both: (a) the input of a hopper shut off valve in the form of refrigerant solenoid 304 that determines the provision of the high pressure refrigerant to capillary tube 310 associated with the hopper evaporator coils and (b) to the inputs of expansion solenoid valves 306 and 308, each of which is associated with one of the barrel evaporator coils. The hopper shut off valve 304 and the expansion solenoid valves 306 and 308 are independently controllable by electrical signals provided by a control system (not illustrated in FIG. 11).

Figure 12:
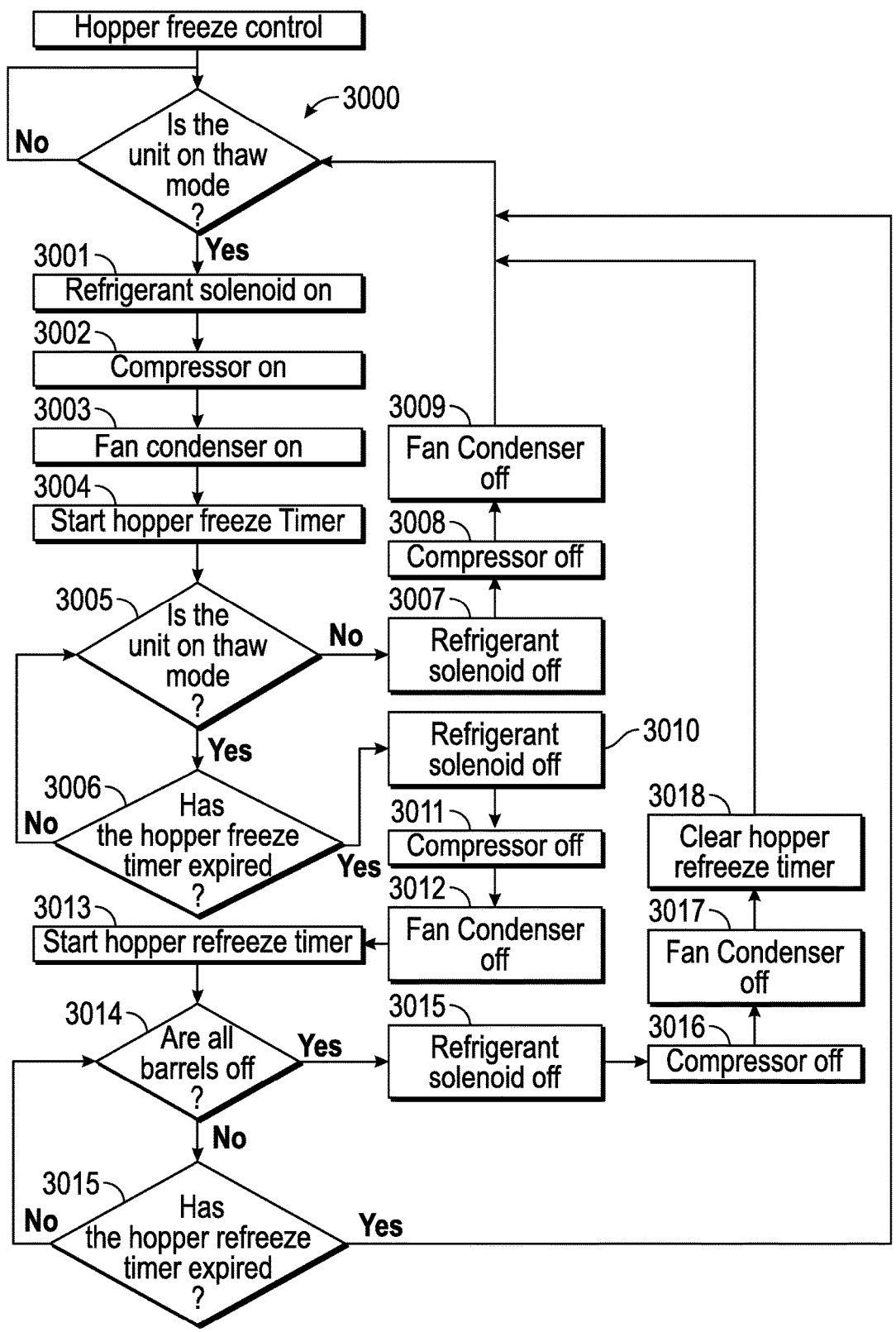
FIG. 12 illustrates a control approach for ensuring that both the hoppers and the barrels of exemplary split refrigeration system of FIG. 11 are properly cooled and that barrel freezing of the product is given priority over cooling of the hoppers in accordance with certain teachings set forth herein.

FIG. 12 illustrates a control approach for ensuring that both the hoppers and the barrels are properly cooled and that barrel freezing of the product is given priority over cooling of the hoppers.

Referring to FIG. 12, the control system will start at Step 3000 by determining whether the frozen product dispenser is in a Thaw Mode (i.e., a mode where no high pressure refrigerant is to be provided to the barrel evaporators and/or where hot gas is being provided to the barrel evaporators). If the dispenser is not in a Thaw mode—meaning that it may be necessary to provide high pressure refrigerant to the barrel evaporators for the initial freezing operation—then the system will loop back to Step 3000 and await the first instance in which the system is placed in a Thaw Mode.

Upon detection that the system is in a Thaw Mode at Step 3000, the system will move to Steps 3001-3004 where the refrigerant solenoid 304 that controls the provision of high pressure refrigerant to the hopper evaporator coils is turned ON, the compressor 300 is turned ON, the fan condenser is turned ON and the hopper freeze timer is started. These steps will result in the initiation of hopper cooling and/or freezing. The time associated with the hopper freeze timer determines the interval over which the hopper freezing/cooling operation will occur in the absence of the system exiting the Thaw Mode during the freezing/cooling interval corresponding to the hopper freeze timer.

After initiating the initial cooling/freezing of the hoppers in Steps 3001-3004, the system will move to Step 3005 where it again determines if the system is in Thaw Mode. If it is in Thaw Mode (meaning that it will not be necessary to provide refrigerant to the barrel evaporators) the system will move to Step 3006 where it determines whether the hopper freeze timer has expired. If the hopper freeze timer has not expired, the system will loop back to Step 3005 and continue the process such that—if the unit is not taken out of Thaw Mode—the system will continue to provide refrigerant to the hopper evaporator coils and to therefore cool the hopper contents for a period defined by the hopper freeze timer.

If it is determined in Step 3005 that during freezing/cooling of the hopper that the system has been taken out of the Thaw Mode (e.g., because it is necessary to freeze a barrel), the system will proceed to Steps 3007-3009 where the refrigerant solenoid 304 that controls the provision of high pressure refrigerant to the hopper evaporator coils is turned OFF, the compressor 300 is turned OFF, and the fan condenser is turned OFF, thus halting and interrupting the initial hopper cooling and/or freezing. The system will then loop to Step 3000 where the process described above is repeated.

Eventually the system will reach a point where the initial hopper freeze time is determined to have expired at Step 3006. At that point the system will proceed to halt the hopper freeze/cooing operations by passing through Steps 3010-3012 where the refrigerant solenoid 304 that controls the provision of high pressure refrigerant to the hopper evaporator coils is turned OFF, the compressor 300 is turned OFF, and the fan condenser is turned OFF, thus ending hopper cooling and/or freezing.

The system will then proceed to Step 3013 where a hopper refreeze timer is initiated. The hopper refreeze timer sets a time interval between hopper freezing/cooling operations. After setting the hopper refreeze timer, the system will proceed to Step 3014 where it determines whether all of the barrels are off. If all the barrels are off—meaning that there is no need for the system to provide refrigerant to the barrels—it will proceed to steps 3015-3018 where the refrigerant solenoid 304 that controls the provision of high pressure refrigerant to the hopper evaporator coils is turned OFF, the compressor 300 is turned OFF, and the fan condenser is turned OFF, thus halting and interrupting the initial hopper cooling and/or freezing. The system will then loop to Step 3000 where the process described above is repeated.

If it is determined in Step 3014 that one or more of the barrels is on, such that refrigerant is, or may be required to be supplied by the barrels, the system will proceed to Step 3015 where it determines whether the hopper refreeze time has expired. If not, the system will loop back to Step 3014, if so, the system will proceed to Step 3000 where the process is repeated.

By following the control approach described above, the system gives priority to barrel freezing and cooling operations.

In addition to including the product storage and product refrigeration systems described above, the exemplary frozen product dispenser of FIGS. 1A-1C also includes a product dispensing system. In one embodiment, the product dispensing system comprises a dispensing valve and auger element coupled to the shaft of the beater/scraper such that rotation of the beater/scraper (through activation of one of the direct drive motors) will cause rotation of the auger and dispensing of the frozen product when the dispensing valve is open.

Figure 13A:
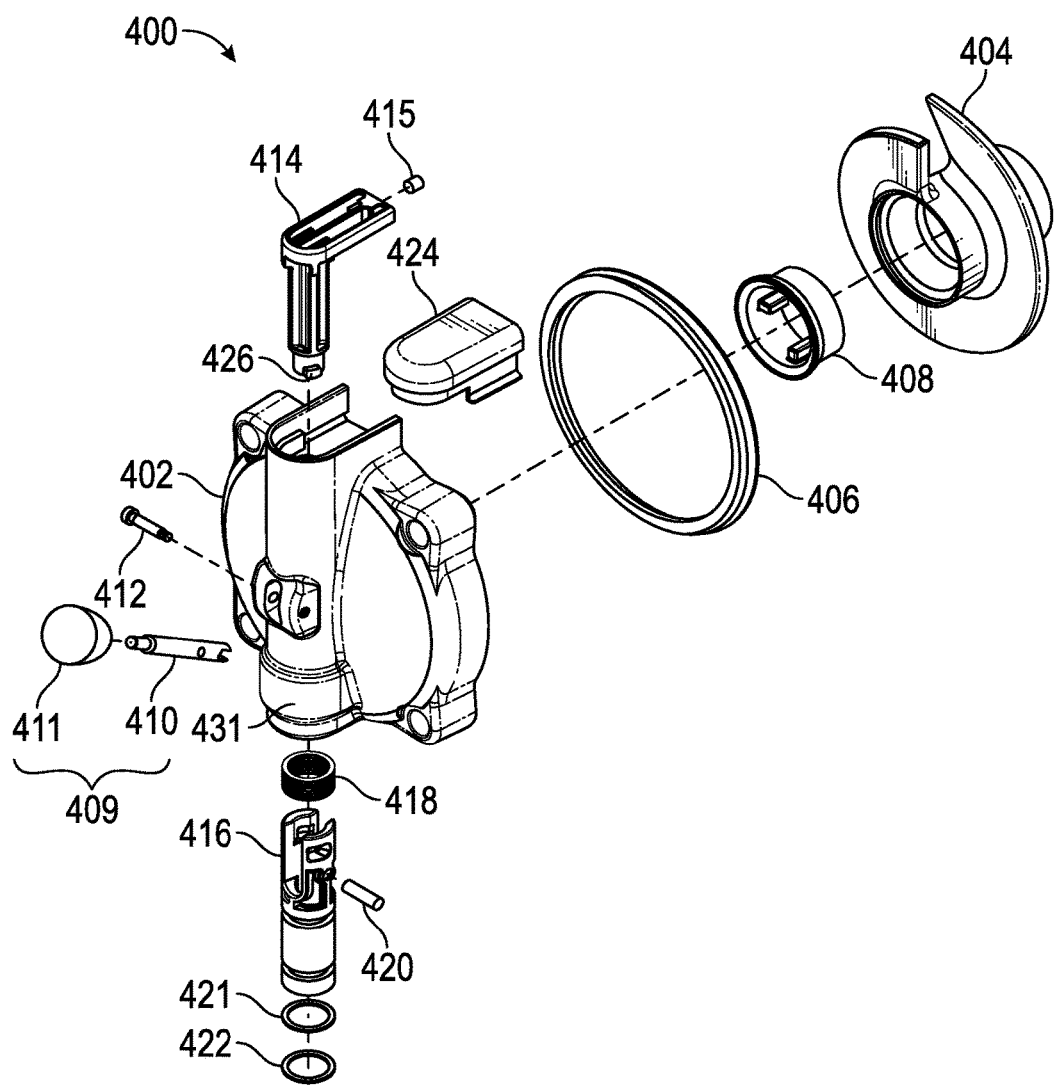
FIGS. 13A, 13B, 13C and 14 illustrate one embodiment of a novel dispensing valve that is easy to remove and disassemble for cleaning, and easy to assemble after cleaning, without the use of tools in accordance with certain teachings set forth herein.
Figure 13B:
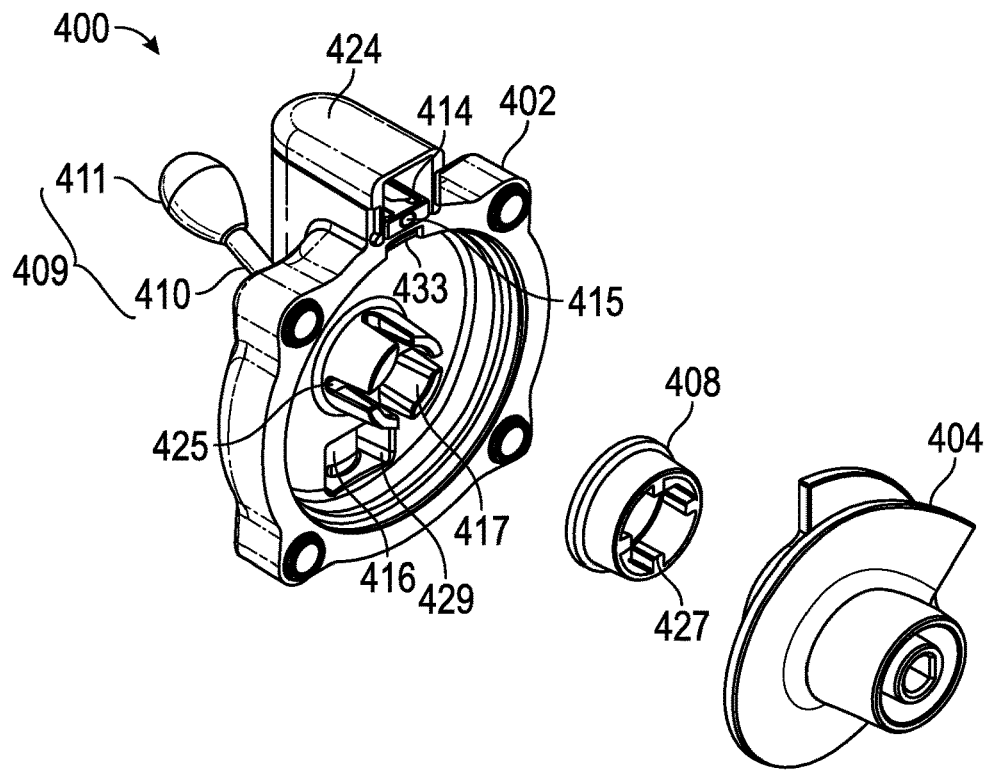
Figure 13C:
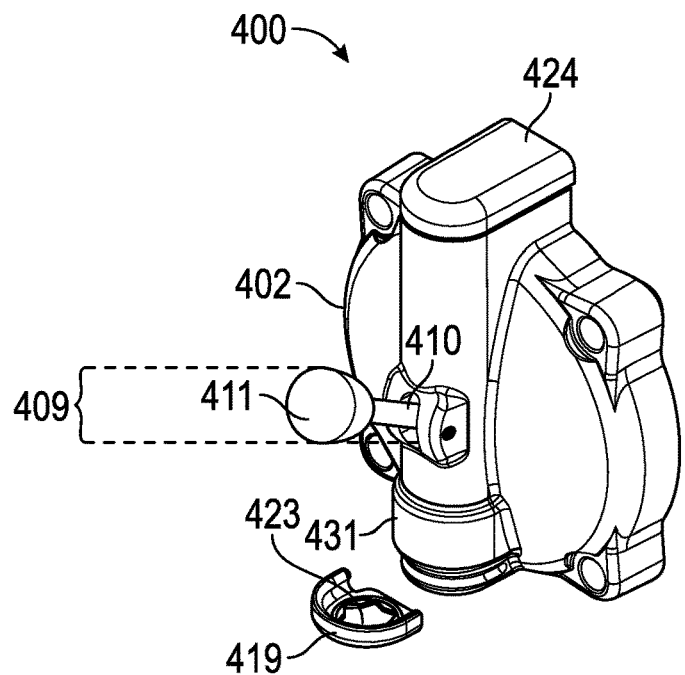

FIGS. 13A, 13B, and 13C illustrate one embodiment of a novel dispensing valve 400 that is easy to remove and disassemble for cleaning, and easy to assemble after cleaning, without the use of tools. FIG. 13A illustrates a front or exterior perspective view of a novel dispensing valve 400. FIG. 13B illustrates a back or inside front perspective view of a novel dispensing valve 400. FIG. 13C illustrates a front or exterior perspective view a novel dispensing valve 400 with an optional extruder cap 419.

Turning to FIGS. 13A, 13B, and 13C, the disclosed dispensing valve embodiments includes a face plate 402 that, in use is affixed to the front surface of the frozen product dispenser, in the manner shown for dispensing valves 400 and 401 in FIGS. 1A-1C. A resilient generally O-shaped seal 406 is positioned within the back side of the face plate 402 such that it forms a seal when the face plate 402 is tightened against the front face of the frozen product dispenser.

Operating in conjunction with the face plate 402 is an auger 404 that, on one end, is adapted to be received by the shaft of the beater/scraper (not shown in FIGS. 13A, 13B, and 13) such that, when the beater/scraper is rotated by activation of one of the direct drive motors (not shown in FIGS. 13A, 13B, and 13C), the auger 404 will rotate. The auger 404 is coupled to the back side of the face plate 402 at connection 417 through the use of a bushing 408. The purpose of the bushing 408 is to allow the auger 404 to rotate about the bushing 408 (rather than a feature of the face plate 402) such that any wear resulting from such rotation will be on the bushing 408 (which can be readily replaced) and not on the faceplate 402 (which may be more costly to replace). Connection 417 may include grooves 425. Bushing 408 may include tabs 427 to engage with grooves 425. Alternatively, bushing 408 and connection 417 may include round surface without the tabs 427 and grooves 425. Other known connections methods may be used.

An activation handle 409, comprising knob 411 and shaft 410 is coupled to the faceplate 402 via a screw 412 that is configured with a non-threaded center section to permit the shaft 410 to rotate about the screw 412. The end of the shaft 410 not coupled to the knob 411 is notched to receive, in the fully-assembled device, a lower valve member 416.

The lower valve stem 416 includes a variety of features including notches for receiving O-rings 421 and 422. Through the use of O-rings 421, 422, the lower valve stem 416 is positioned within a tubular channel of the faceplate 402 in a sealing relationship. A spring 418 is positioned in the upper portion of the lower valve stem 416. The spring 418 is held in place through the use of a dowel pin 420. Also passing through the tubular channel of the face plate 402 when assembled is an upper valve stem 414. The upper valve stem 414 includes features that can be removably received in corresponding receiving features of the lower valve stem 416 such that by depressing the upper valve stem 414 into the tubular channel (and against the force of the spring 418) and rotating the upper valve member 414, the upper valve member 414 can be matingly coupled to the lower valve member 416. In other words, the upper and lower valve stems 414, 416 may be locked together through a twist of the upper valve stem 414 such that molded pins 426 on the upper valve stem 414 engage slots on the lower valve member 416.

As shown in FIG. 13A, the faceplate 402 defines a rectangular channel and the upper valve stem 414 includes an upper rectangular feature that can fit within the faceplate rectangular channel. Once the upper valve stem 414 is coupled to the lower valve stem 416, the connected valve stems can be moved to a position where the rectangular feature of the upper valve stem 414 fits within the rectangular channel of the faceplate 402. Preferably, the length of the channel is such that, as the valve 400 moves from its fully closed position to its fully open position the rectangular feature of the upper valve stem 414 will always be within the rectangular channel. This positioning will prevent the upper valve stem 414 from rotating and maintain the locked status of the upper and lower valve stems 414, 416. A sliding cap element 424 may then be used to hold the upper valve stem 414 in position relative to the lower valve stem 416 such that, when the cap element 424 is slid in place, the entire assembly will be held. Lower valve stem 416 may be positioned such that it is flush with the bottom of faceplate 402. This configuration may allow a more desirable dispensing of the product from the dispensing valve 400. For example, it may prevent product from remaining attached to the bottom of the faceplate at the end of a product dispense.

As shown in FIG. 13B, faceplate 402 defines a cavity 429. Cavity 429 may be a formed from a transparent material to allow the product dispensed by the dispensing valve 400 to be visible. Cavity 429 may provide an aesthetically pleasing flow path for the product. It also functionally shows the color of the product to the potential end customer. The exterior surface 431 of cavity 429 is shown in FIG. 13A. As shown in FIG. 13B, faceplate 402 may define a notch 433. Notch 433 is designed to more easily allow for the removal of gasket 406 without the use of tools.

As shown in FIG. 13C, an optional extruder cap 419 may be connected to the faceplate 402. Extruder cap 419 includes an opening 423 shown in FIG. 13C as a star. Alternatively, extruder cap 419 may include a smaller or larger opening in a number of different shapes including for example, an oval, a circle, a square, a diamond, half-moon or other shapes for marketing and creating an ascetically pleasing dispensing of product from the dispensing valve 400. Extruder cap 419 may be replaceable or swappable with a differently configured extruder cap. In other embodiments or in conjunction with other embodiment, extruder cap 419 may not include opening 423 so it may be used to seal the dispensing valve 400. Extruder cap 419 may change the flow rate of the product from dispensing valve 400. As another alternative, extruder cap 419 may include a sensor to determine the status of the product dispensed from the dispensing valve 400. For example, the sensors could determine if the product is (i) being correctly dispensed, (ii) the correct color, (iii) the correct texture, (iv) the correct smoothness, or (v) satisfying some other characteristic.

A magnet 415 is positioned within an end of the upper valve stem 414.

When the components of the valve 400 are assembled as describe above and held in place through proper positioning of the sliding cap 424, movement of the activation handle 409 will result in movement of the lower valve member 416 (and the upper valve member 414) such that a passage is created from the interior of the freezing barrel to the outside. When this passage is created, rotation of the auger 404 will result in the dispensing of frozen product within the barrel through the passage.

Actuation of the valve will also result in movement of the upper valve member 414. This movement can be detected though the use of a magnetic reed switch (in one embodiment on the face of the frozen product dispenser) which will detect movement of the magnet 415. The sensing of the activation of the dispense valve 400 through the use of such a reed switch can be used, for example, to initiate rotation of the auger 404 and product dispensing (in the event that the auger 404 was not rotating at the time the valve 400 was activated). It can also be used to determine the total dispense time (from given time) which can be useful in predicting Sold-Out conditions as described above.

One benefit of the construction of the valve 400 is that it can be easily and quickly disassembled and reassembled for cleaning purposes. An exemplary process for disassembling the valve 400 is described below in connection with FIG. 14. The process for assembling will not be described separately as it is the reverse of the described assembly process.

Figure 14:
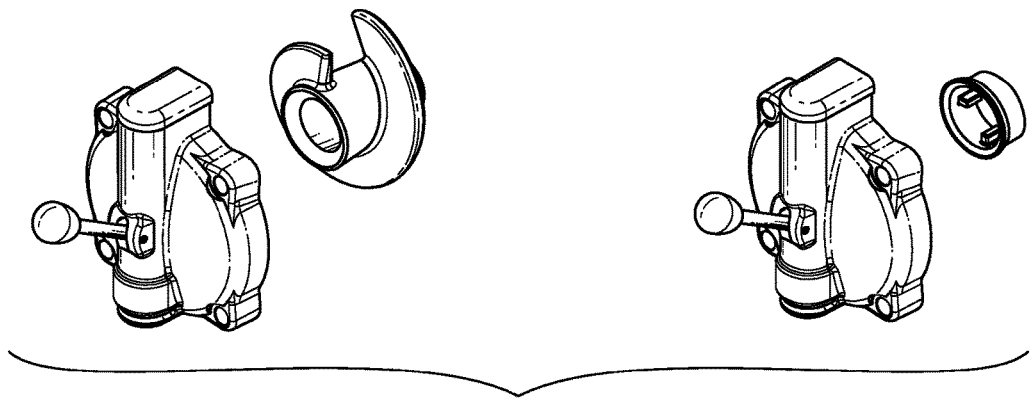
Figure 14:
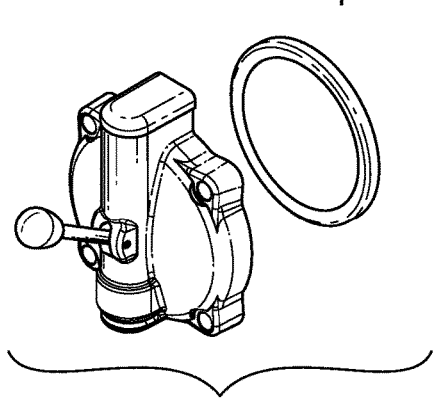
Figure 14:
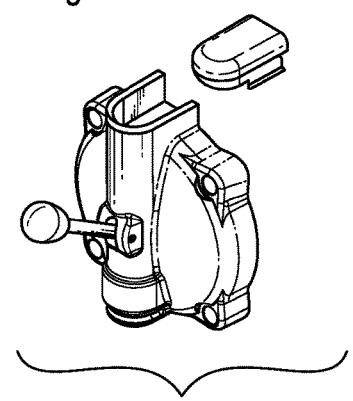
Figure 14:
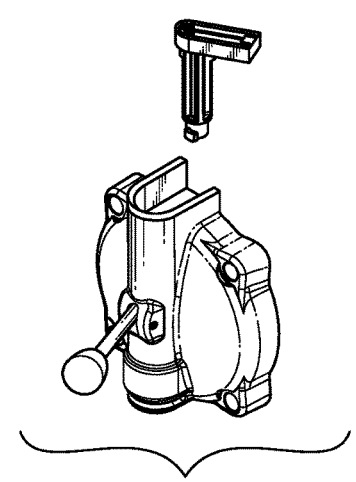
Figure 14:
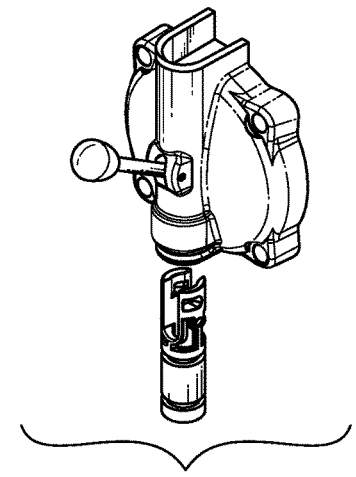
Figure 15:
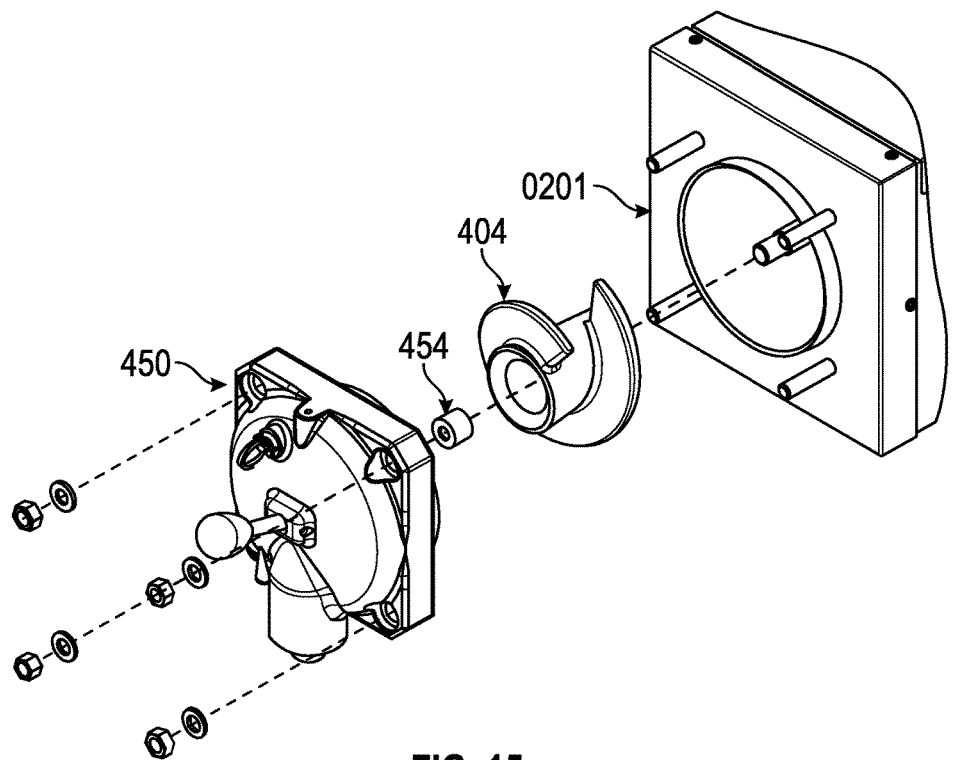
FIGS. 15, 16, and 17A-17B illustrate an alternate embodiment of a product dispenser system in accordance with certain teachings set forth herein.
Figure 16:
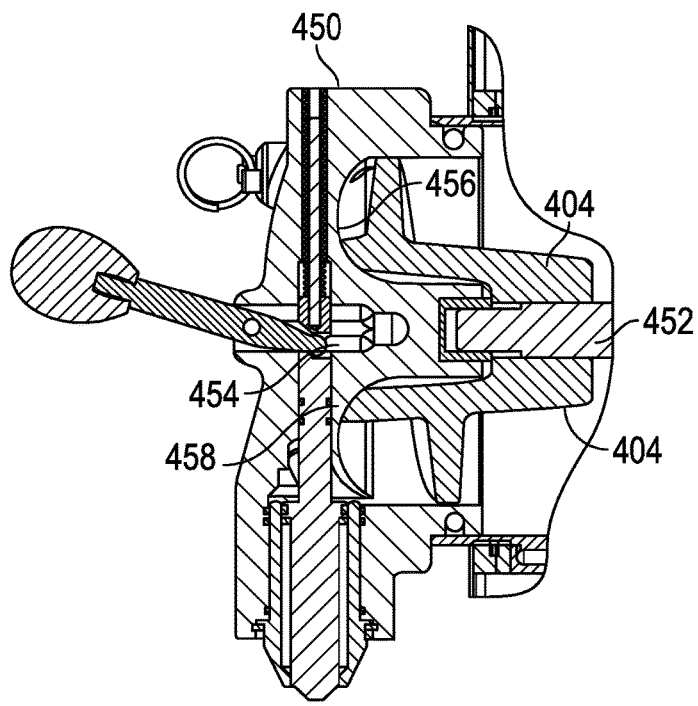
Figure 17A:
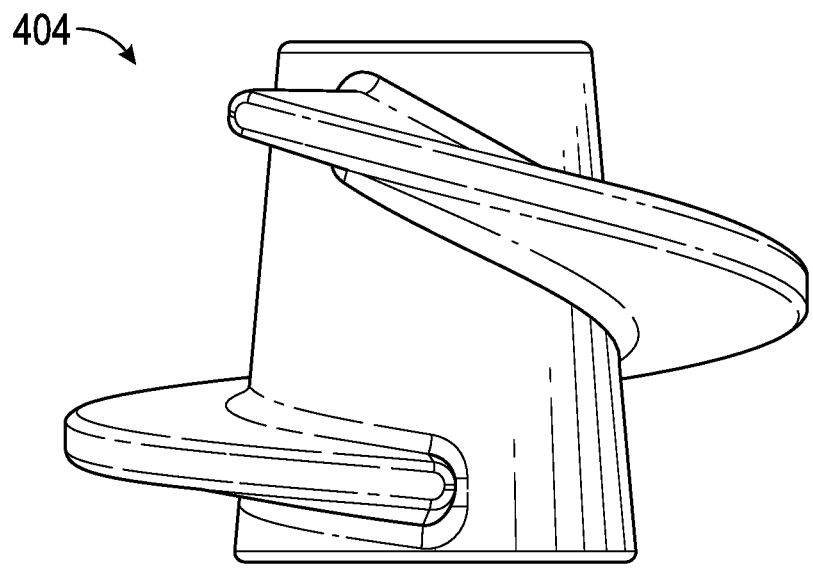
Figure 17B:
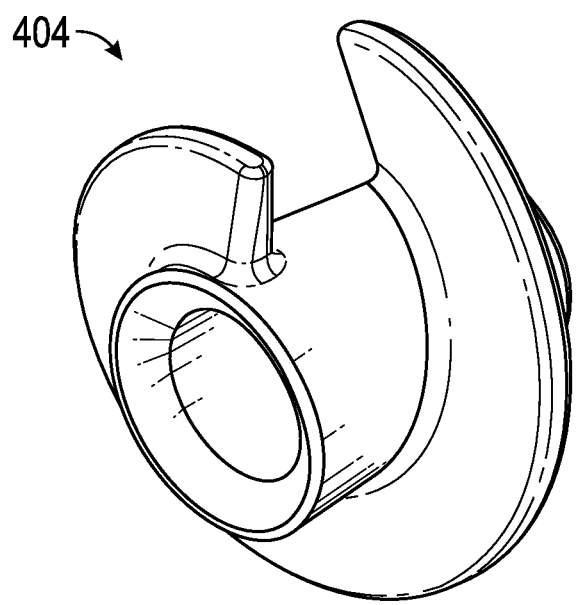

Turning to FIG. 14, the first step in disassembling the valve 400 will be to remove the valve assembly 400 from the face of the frozen product dispenser by, for example, unscrewing the four bolts coupling the valve 400 to the dispenser. The next step—Step 1 in FIG. 14—will be to remove the auger 404 and the bushing from the interior surface. This is something that should be able to be accomplished by hand.

After the bushing is removed in Step 1, the seal can be removed in Step 2 and the sliding cap removed in Step 3. Removal of the sliding cap in Step 3 will allow manual movement of the upper and lower valve members such that the upper valve member (or upper valve stem as described in FIG. 14) can be moved to its highest position and removed by rotation in Step 4. Finally, in the final Step 5, the lower valve member (lower valve stem) can be removed.

As will be apparent, the process of disassembling (and then reassembling) the valve 400 can be accomplished by hand and without tools.

It will be appreciated that the Steps 1-5 in FIG. 14 need not be performed in the specific described order and that the order of steps may be changed. For example, it is possible to remove the seal prior to removal of the bushing and it is possible to remove the various valve elements before the seal and bushing are removed.

FIGS. 15, 16, and 17A-17B illustrate an alternate embodiment of a product dispenser system. Like the embodiments described in connection with FIGS. 13 and 14, this embodiment utilizes an augur 404 that is coupled to the shaft 452 of the beater/scraper positioned in the freezing barrel. In one embodiment, the auger 404 is keyed to fit over the end of the beater/scraper.

The illustrated embodiment includes a faceplate 450 that includes a curved inner surface that defines a bushing 454 and an inner doughnut shaped recess that defines a first inner curved region 456 and a second inner curved region 458. The front face of the auger 404 is configured to donut shaped recess. In operation, the shape of the auger cooperates with the recess in the fact plate to define a region of decreasing cross section as the auger is rotated. Rotation of the auger and this decreasing section will result in pressure being applied to the product and, in turn, to dispensing of the product when the dispensing valve is open.

Other and further embodiments utilizing one or more aspects of the inventions described above can be devised without departing from the spirit of Applicant's invention Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A product dispensing system, comprising:
a faceplate having a front face and a rear face, the faceplate defining:
a tubular channel extending substantially vertically within the faceplate,
a rectangular channel extending substantially horizontally on a top portion of the faceplate and open to the rear face but not the front face,
an upper valve member positioned relative to the faceplate such that at least a portion of the upper valve member is received within the rectangular channel;
a lower valve member received within the tubular channel,
a handle coupled to the lower valve member and configured to translate the lower valve member in the tubular channel; and
wherein the upper valve member and the lower valve member are removably coupled such that movement of the handle also moves the upper valve member.

2. The system of claim 1, wherein the upper valve member and the lower valve member are rotatably coupled.

3. The system of claim 1, wherein at least a portion of the upper valve member is received within the tubular channel.

4. The system of claim 1, wherein the tubular channel and the rectangular channel intersect.

5. The system of claim 1, wherein an end of the lower valve member is flush with a bottom of the faceplate.

6. The system of claim 1, further comprising an extruder cap, the extruder cap comprising an opening configured to define a visual appearance of a dispensed product.

7. The system of claim 6, wherein the extruder cap is removable.

8. The system of claim 1, wherein movement of the upper valve member in conjunction with the lower valve member is configured to activate an auger for dispensing product.

9. A product dispensing system, comprising:
a faceplate, the faceplate defining:
   a tubular channel extending substantially vertically on a front face of the faceplate,
   a trough extending substantially horizontally on a top portion of the faceplate and intersecting the tubular channel, the trough open to a rear face of the faceplate, but not open to the front face of the faceplate;
an upper valve member at least a portion of which is received within the trough;
a lower valve member received within the tubular channel, wherein the upper valve member and the lower valve member are coupled within the tubular channel; and
a handle assembly rotatably coupled to the faceplate and to the lower valve member such that movement of the handle assembly moves the lower and upper valve members.

10. The dispensing mechanism of claim 9, wherein at least a portion of the upper valve member is received within the tubular channel.

11. The product dispensing system of claim 9, wherein a cross-section of the trough has three sides.

12. The product dispensing system of claim 9, comprising a cap configured to removably cover at least a portion of the trough.

13. The product dispensing system of claim 9, wherein the upper valve member comprises a magnet.

14. The system of claim 13, wherein movement of the upper valve member in conjunction with the lower valve member is configured to activate a switch.

15. The product dispensing system of claim 9, further comprising a product auger, a portion of which is received within a cavity in the rear face of the faceplate.

16. The product dispensing system of claim 15, wherein the cavity comprises a notch configured to allow for removal of a faceplate gasket without the use of a tool.

17. The product dispensing system of claim 15, wherein movement of the upper valve member in conjunction with the lower valve member is configured to activate the auger.

18. The system of claim 9, further comprising a removable product extruder cap.

19. The system of claim 9, wherein the upper valve member is removably coupled to the lower valve member.

20. The system of claim 9, wherein an end of the lower valve member is configured to be flush with a bottom of the faceplate.

* * * * *